US012219269B2

(12) United States Patent
Yu et al.

(10) Patent No.: US 12,219,269 B2
(45) Date of Patent: *Feb. 4, 2025

(54) METHOD AND SYSTEM FOR DETERMINING OCCLUSION WITHIN A CAMERA FIELD OF VIEW

(71) Applicant: MUJIN, INC., Tokyo (JP)

(72) Inventors: Jinze Yu, Tokyo (JP); Jose Jeronimo Moreira Rodrigues, Tokyo (JP); Xutao Ye, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,980

(22) Filed: Feb. 29, 2024

(65) Prior Publication Data
US 2024/0276106 A1     Aug. 15, 2024

Related U.S. Application Data

(63) Continuation of application No. 17/228,783, filed on Apr. 13, 2021, now Pat. No. 11,924,559, which is a
(Continued)

(51) Int. Cl.
*H04N 23/80*     (2023.01)
*B25J 9/16*     (2006.01)
(Continued)

(52) U.S. Cl.
CPC ........... *H04N 23/80* (2023.01); *H04N 23/698* (2023.01); *H04N 23/81* (2023.01); *B25J 9/1612* (2013.01)

(58) Field of Classification Search
CPC ........... H04N 5/23229; H04N 5/23238; H04N 5/217; G06K 9/4638; G06K 9/468;
(Continued)

(56) References Cited

U.S. PATENT DOCUMENTS 9,424,470 B1    8/2016   Hinterstoisser
11,006,039 B1 *    5/2021   Yu .................... H04N 23/81
(Continued)

FOREIGN PATENT DOCUMENTS

CN     104662589 A     5/2015
CN     105794194 A     7/2016
(Continued)

OTHER PUBLICATIONS

Tanioka, H. and Kimitaka, K., "Image Processing for Virtual Histology of the Vestibular End-Organs," AASRI International Conference on Industrial Electronics and Applications (IEA 2015), Atlantis Press, pp. 235-238 (2015).
(Continued)

*Primary Examiner* — Christopher K Peterson
(74) *Attorney, Agent, or Firm* — MEDLER FERRO WOODHOUSE & MILLS PLLC

(57) ABSTRACT

A system and method for determining occlusion are presented. The system receives camera data generated by at least one camera, which includes a first camera having a first camera field of view. The camera data is generated when a stack having a plurality of objects is in the first camera field of view, and describes a stack structure formed from at least an object structure for a first object of the plurality of objects. The system identifies a target feature of or disposed on the object structure, and determines a 2D region that is co-planar with and surrounds the target feature. The system determines a 3D region defined by connecting a location of the first camera and the 2D region. The system determines, based on the camera data and the 3D region, a size of an occluding region, and determines a value of an object recognition confidence parameter.

20 Claims, 21 Drawing Sheets

Related U.S. Application Data continuation of application No. 16/789,570, filed on Feb. 13, 2020, now Pat. No. 11,006,039.

(51) Int. Cl.
  *H04N 23/698* (2023.01)
  *H04N 23/81* (2023.01)

(58) Field of Classification Search
  CPC ........ G06K 9/00201; G06K 9/48; G06K 9/50; G06T 7/64; G06T 2207/10028; G06T 2207/20164; B25J 9/1612
  See application file for complete search history.

(56) References Cited

U.S. PATENT DOCUMENTS

| | | | |
|---|---|---|---|
| 11,924,559 B2 * | 3/2024 | Yu | .......................... H04N 23/81 |
| 2016/0004298 A1 | 1/2016 | Mazed et al. | |
| 2017/0220887 A1 | 8/2017 | Fathi et al. | |

FOREIGN PATENT DOCUMENTS

| | | |
|---|---|---|
| CN | 106471621 A | 3/2017 |
| CN | 108555908 A | 9/2018 |
| CN | 110103219 A | 8/2019 |
| CN | 110490922 A | 11/2019 |
| CN | 110555872 A | 12/2019 |
| DE | 112019000049 T5 | 1/2020 |
| JP | 2010-205095 A | 9/2010 |
| JP | 2013-101045 A | 5/2013 |
| JP | 2016-099257 A | 5/2016 |
| JP | 2017-162449 A | 9/2017 |
| JP | 2017-217726 A | 12/2017 |
| JP | 2019-136828 A | 8/2019 |

OTHER PUBLICATIONS

Wang et al., "3D Vision-Based Picking System with Instance Segmentation Network and Iterative Optimization Method," Robot vol. 41, No. 5: 637-648 (Sep. 2019).

* cited by examiner

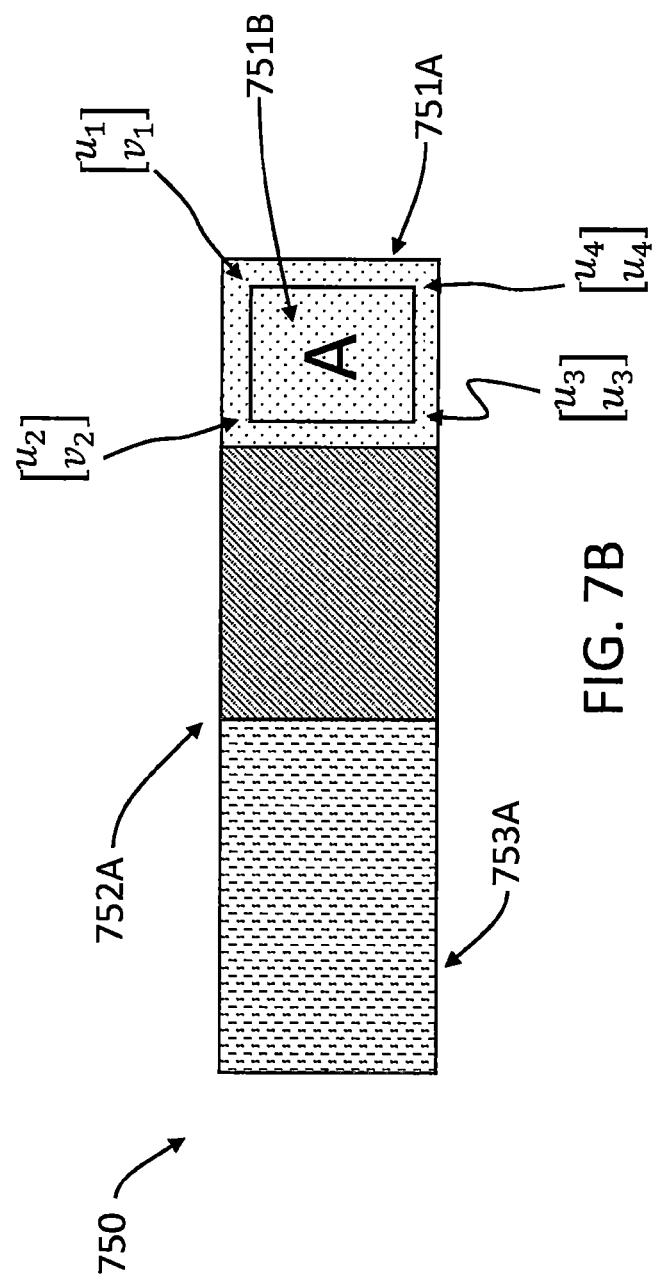

METHOD AND SYSTEM FOR DETERMINING OCCLUSION WITHIN A CAMERA FIELD OF VIEW

FIELD OF THE INVENTION

The present invention is directed to a method and system for determining occlusion within a camera field of view.

BACKGROUND

As automation becomes more common, robots are being used in more environments, such as in warehousing and manufacturing environments. For instance, robots may be used to load objects onto or off of a pallet in a warehouse, or to pick up objects from a conveyor belt in a factory. The movement of the robot may be fixed, or may be based on an input, such as camera data generated by a camera in the warehouse or factory. For instance, the camera data may represent a location and/or structure of an object relative to a gripper or other component of the robot that is configured to interact with the object. Relying on the camera data to aid the robot's interaction with the object may be subject errors caused by noise and/or inaccuracies in recognizing the object from the camera data.

SUMMARY

One aspect of the embodiments herein relates to a computing system, a method, and/or a non-transitory computer-readable medium having instructions for determining occlusion. The computing system may include, e.g., a communication interface and a control circuit. The communication interface may be configured to communicate with at least one camera, which includes a first camera having a first camera field of view. The control circuit may be configured, when a stack having a plurality of objects is in the first camera field of view, to perform the method for determining occlusion. In some cases, the control circuit may perform the method by executing instructions stored on the non-transitory computer-readable medium. The method may include receiving camera data generated by the at least one camera, wherein the camera data describes a stack structure for the stack, the stack structure being formed from at least an object structure for a first object of the plurality of objects; identifying, based on the camera data generated by the at least one camera, a target feature of or disposed on the object structure (e.g., a corner of the object structure, an edge of the object structure, a visual feature disposed on a surface of the object structure, or an outline of the surface of the object structure). The method may further include determining a two-dimensional (2D) region that is co-planar with the target feature and whose boundary surrounds the target feature; determining a three-dimensional (3D) region defined by connecting a location of the first camera and the boundary of the 2D region, wherein the 3D region is part of the first camera field of view; determining, based on the camera data and the 3D region, a size of an occluding region, the occluding region being a region of the stack structure that is located between the target feature and the at least one camera and is within the 3D region. In an embodiment, the control circuit may determine a value of an object recognition confidence parameter based on the size of the occluding region. In an embodiment, the control circuit may perform an operation for controlling robot interaction with the stack structure, wherein the operation is performed based on the value of the object recognition confidence parameter.

BRIEF DESCRIPTION OF THE DRAWINGS

The foregoing and other features, objects and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIGS. 7A-7D depict an embodiment in which occlusion is determined based on a target feature that is a visual feature disposed on a surface of an object structure or an outline of the surface, according to an embodiment hereof.

DETAILED DESCRIPTION

Figure 1A:
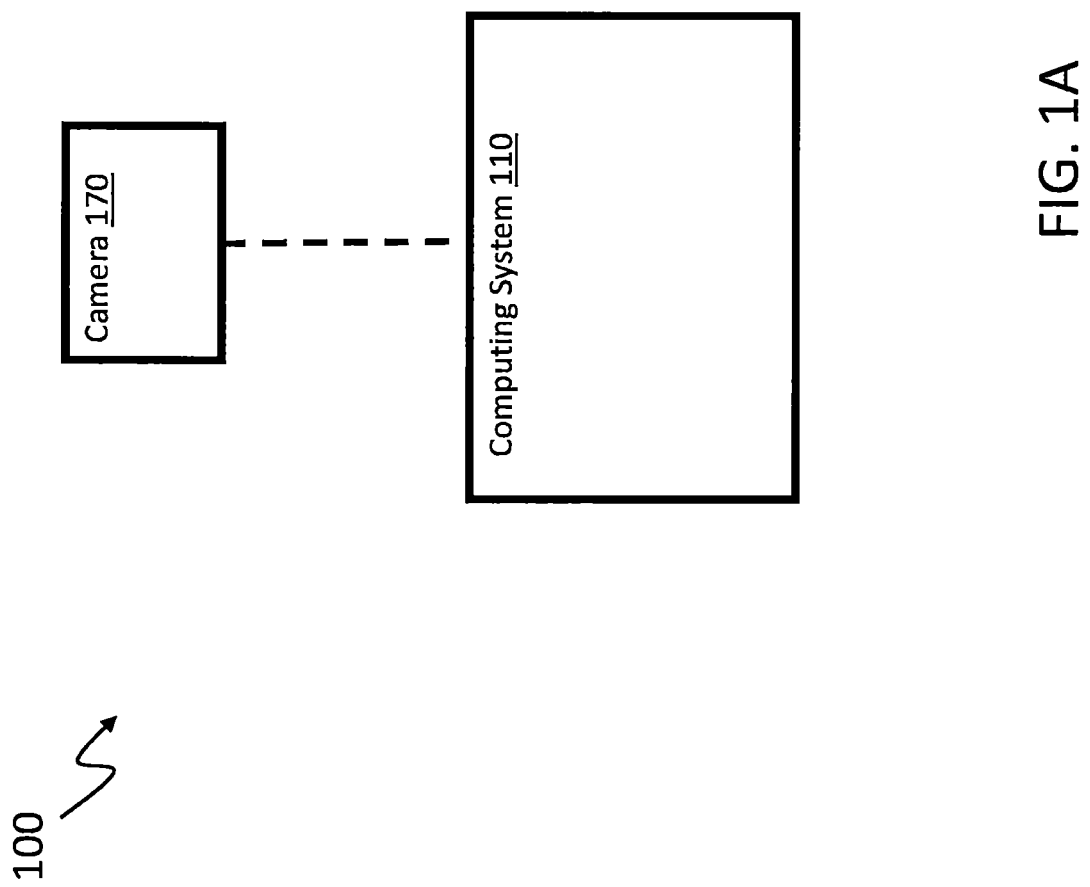
FIGS. 1A-1B depict block diagrams of systems in which camera occlusion may be detected, according to an embodiment herein.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments described herein relate to determining occlusion within a camera field of view, such as by detecting occlusion within the camera field of view, assessing a level of occlusion with the camera field of view, and/or any other aspect of occlusion analysis. The occlusion may refer to, e.g., a situation in which a location in the camera field of view, or a portion of a region surrounding the location, is blocked or close to being blocked from being viewed or otherwise being sensed by a camera. In some instances, the occlusion may be due to an object or portion thereof that is blocking or close to blocking a line of sight from the camera to that location, or from the camera to the portion of the region surrounding that location. For example, the occluding object may be located between the camera and the occluded location or occluded portion of the region surrounding the location. In some instances, a target feature may be disposed at the location or region surrounding the location. The target feature may be, e.g., a feature of the region that is used to perform object recognition, and may be used, e.g., to plan robot interaction with a structure at that region. For example, the target feature may be a corner or edge of an object or a surface thereof at that region, or may be a visual feature disposed on the surface. The presence of the occluding object may affect an ability to identify the target feature, and/or affect an accuracy of such an identification. Accordingly, one aspect of the embodiments herein relates to detecting or otherwise assessing occlusion that may affect a target feature or any other feature within a camera field of view.

In an embodiment, determining the occlusion may involve determining a size of an occluding region. The occluding region may be, for example, a region of an occluding object that is located between the camera and the target feature, or between the camera and a portion of a region surrounding the target feature. For instance, the occluding region may be a 2D region of the occluding object (which may be a first 2D region) that is within a 3D region, wherein the 3D region may be defined by connecting a location of the camera to a 2D region surrounding the target feature (which may be a second 2D region). In an embodiment, determining the occlusion may involve determining a size of an occluded region, which is discussed below in more detail. In some cases, the size of the occluding region (and/or of the occluded region) may be used to determine, e.g., a level of confidence for objection recognition that involved or will involve the target feature. In some cases, the level of confidence may be determined in a manner that causes it to be inversely related to the size of the occluding region and/or the size of the occluded region.

In an embodiment, the occlusion analysis may be used, for instance, to determine whether to re-perform object recognition, or to adjust a manner in which the object recognition is performed. For example, if the level of confidence for an object recognition operation is below a defined threshold (e.g., a defined confidence threshold), the object recognition operation may be re-performed. The level of confidence for the object recognition may be below the defined threshold as a result of, e.g., an amount of occlusion being too high, such as when a ratio between the size of the occluding region and a size of the 2D region surrounding the target feature exceeds a defined occlusion threshold, or when the size of the occluding region exceeds the defined occlusion threshold. The defined occlusion threshold may, in some cases, be an inverse of the defined confidence threshold, and/or be inversely related to the defined confidence threshold. In some instances, an assessment of the occlusion may be used to plan robot interaction with the occluding object, with the target feature or an object on which the target feature is disposed, or with any other object or structure thereof. For example, the robot interaction may be planned to move the occluding object, and/or the object on which the target feature is disposed, in a manner that decreases an amount of occlusion, or that more specifically decreases a size of the occluding region, as discussed below in more detail.

FIG. 1A illustrates a block diagram of a system 100 for detecting and/or assessing occlusion within a camera field of view. In an embodiment, the system 100 may be located within a warehouse, a manufacturing plant, or other premises. For instance, the system 100 may be a vision system used to generate camera data (e.g., images) of objects within the warehouse or manufacturing plant. In some cases, the vision system may be part of or in communication with a robot control system, which may use the camera data or information derived from the camera data to, e.g., generate movement commands that cause a robot interaction in which a robot interacts with the objects.

As depicted in FIG. 1A, the system 100 may include a computing system 110 and a camera 170 (which may also be referred to as a first camera 170). In an embodiment, the camera 170 may be configured to generate or otherwise acquire camera data that captures a scene in a field of view of the camera 170 (also referred to as a camera field of view). For instance, the camera 170 may be configured to photograph the scene, or more specifically to photograph objects in the camera field of view. In an embodiment, the camera 170 may be a three-dimensional (3D) camera, a two-dimensional (2D) camera, or any combination thereof (the term "or" is used herein to refer to "and/or").

In an embodiment, a 3D camera (which may also be referred to as a depth-sensing camera or structural sensing device) may be a camera configured to generate camera data that includes 3D information about a scene in the camera field of view, wherein the 3D information may include depth information for the scene. More particularly, the depth information may indicate respective depth values, relative to the 3D camera, of locations on one or more objects in the camera field of view. In some cases, the 3D information may include a plurality of 3D data points, such as 3D coordinates, that represent the locations on the one or more objects. For example, the plurality of 3D data points may include a point cloud that represents locations on one or more surfaces of the one or more objects in the camera field of view. In some instances, the 3D camera may include, e.g., a time-of-flight (TOF) camera or a structured light camera.

In an embodiment, a 2D camera may be a camera configured to generate camera data that includes 2D information about a scene in the camera field of view, wherein the 2D information may captures or otherwise represent an appearance of the scene. For instance, the 2D information may be a 2D image or other array of pixels which captures or otherwise represents one or more objects in the camera field of view. The 2D camera may include, e.g., a color camera configured to generate a 2D color image, a grayscale camera configured to generate a 2D grayscale image, or any other 2D camera.

In some instances, the computing system 110 of FIG. 1A may be configured to communicate with the camera 170. For instance, the computing system 110 may be configured to control the camera 170. As an example, the computing system 110 may be configured to generate a camera command that causes the camera 170 to generate camera data that captures a scene in a field of view of the camera 170 (also referred to as a camera field of view), and may be configured to communicate the camera command to the camera 170 via a wired or wireless connection. The same command may cause the camera 170 to also communicate the camera data back to the computing system 110, or more generally to a non-transitory computer-readable medium (e.g., storage device) accessible by the computing system 110. Alternatively, the computing system 110 may generate another camera command that causes the camera 170, upon receiving the camera command, to communicate camera data that it has generated to the computing system 110. In an embodiment, the camera 170 may automatically generate camera data which captures or otherwise represents a scene in its camera field of view, either periodically or in response to a defined triggering condition, without needing a camera command from the computing system 110. In such an embodiment, the camera 170 may also be configured to automatically, without a camera command from the computing system 110, communicate the camera data to the computing system 110 or, more generally, to a non-transitory computer-readable medium accessible by the computing system 110.

Figure 1B:
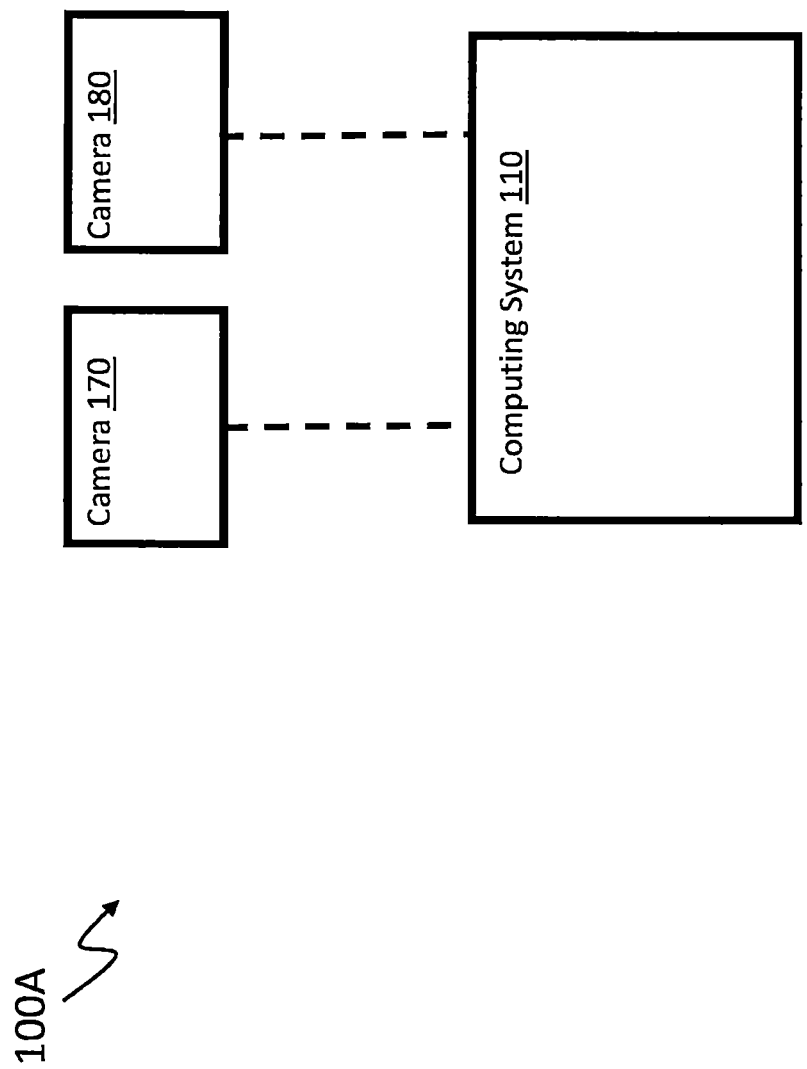

In an embodiment, the system 100 may include only a single camera. In another embodiment, the system 100 may include multiple cameras. For example, FIG. 1B depicts a system 100A, which may be an embodiment of the system 100, that includes the camera 170 and a camera 180, which may also be referred to as a first camera 170 and a second camera 180, respectively. In one example, the first camera 170 may be a 3D camera, while the second camera 180 may be a 2D camera, or vice versa. In some implementations, the computing system 110 may be configured to control the second camera 180 in a manner similar to or the same as the manner in which it controls the first camera 170, as described above with respect to FIG. 1A. In some cases, different camera commands may be sent to the first camera 170 and the second camera 180, respectively. In some cases, a same camera command may be sent to the first camera 170 and the second camera 180. In some cases, the first camera 170 and the second camera 180 may be positioned such that the field of view of the first camera 170 substantially overlap with a field of view of the second camera 180. As such, the first camera 170 and the second camera 180 may be positioned to generate camera data (e.g., an image and/or a point cloud) representing the same area or a substantially the same area.

In some cases, the first camera 170 of FIG. 1B may have a fixed location and/or orientation relative to the second camera 180. For instance, the first camera 170 may be fixedly attached to the camera 180, either directly or indirectly. Such an arrangement may cause an angle and/or a distance between the first camera 170 and the camera 180 to remain fixed. In some cases, such an arrangement may cause a spatial relationship between a coordinate system of the first camera 170 and a coordinate system of the second camera 180 to remain fixed.

Figure 1C:
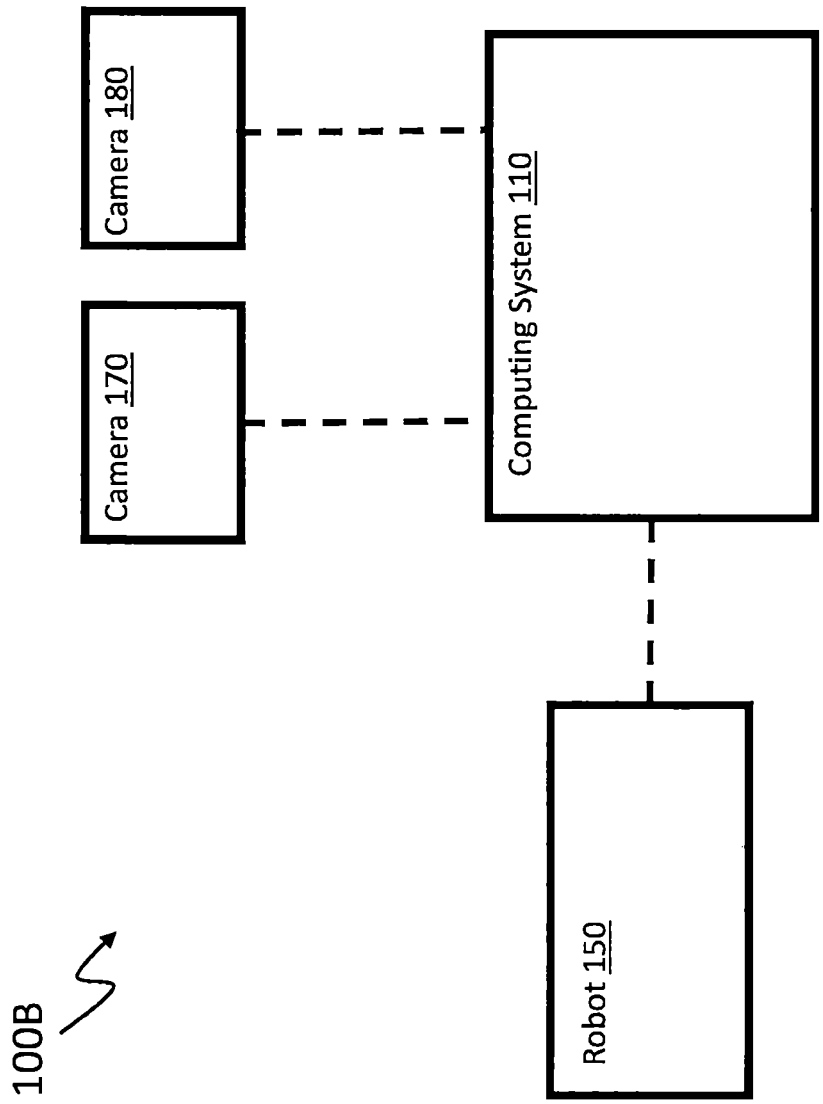
FIG. 1C depicts a block diagram of a robot operation system in which camera occlusion may be detected, according to an embodiment herein.

As stated above, the system 100/100A in some cases may be a robot operation system or part of a robot operation system. For instance, FIG. 1C depicts a system 100B, which may be an embodiment of the system 100/100A, that includes a robot 150 in communication with the computing system 110. In some cases, the computing system 110 may be configured to use the images or other camera data generated by the first camera 170 and/or the second camera 180 to control operation of the robot 150 or implement/execute instructions for controlling operation of the robot 150. For example, the computing system 110 may be configured to control the robot 150 to perform a de-palletization operation in which the robot 150 unloads a stack of boxes or other objects in a warehouse based on camera data generated by the first camera 170 and/or second camera 180.

In an embodiment, the computing system 110 may be configured to communicate via a wired and/or wireless communication with the robot 150 and the first camera 170 and/or second 180. For instance, the computing system 110 may be configured to communicate with the robot 150, the first camera 170, and/or the second camera 180 via a RS-232 interface, a universal serial bus (USB) interface, an Ethernet interface, a Bluetooth® interface, an IEEE 802.11 interface, or any combination thereof. In an embodiment, the computing system 110 may be configured to communicate with the robot 150 and/or the camera 170/180 via a local computer bus, such as a peripheral component interconnect (PCI) bus. In an embodiment, the computing system 110 and the camera 170/180 are located at the same premises (e.g., warehouse). In an embodiment, the computing system 110 may be remote from the robot 150 and/or the camera 170/180, and may be configured to communicate with the robot 150 and/or camera 170/180 via a network connection (e.g., local area network (LAN) connection).

In an embodiment, the computing system 110 of FIG. 1C may be separate from the robot 150, and may communicate with the robot 150 via the wireless or wired connection discussed above. For instance, the computing system 110 may be a standalone computer that is configured to communicate with the robot 150 and the camera 170/180 via a wired connection or wireless connection. In an embodiment, the computing system 110 of FIG. 1C may be an integral component of the robot 150, and may communicate with other components of the robot 150 via the local computer bus discussed above. In some cases, the computing system 110 may be a dedicated control system (also referred to as a dedicated controller) that controls only the robot 150. In other cases, the computing system 110 may be configured to control multiple robots, including the robot 150.

Figure 2:
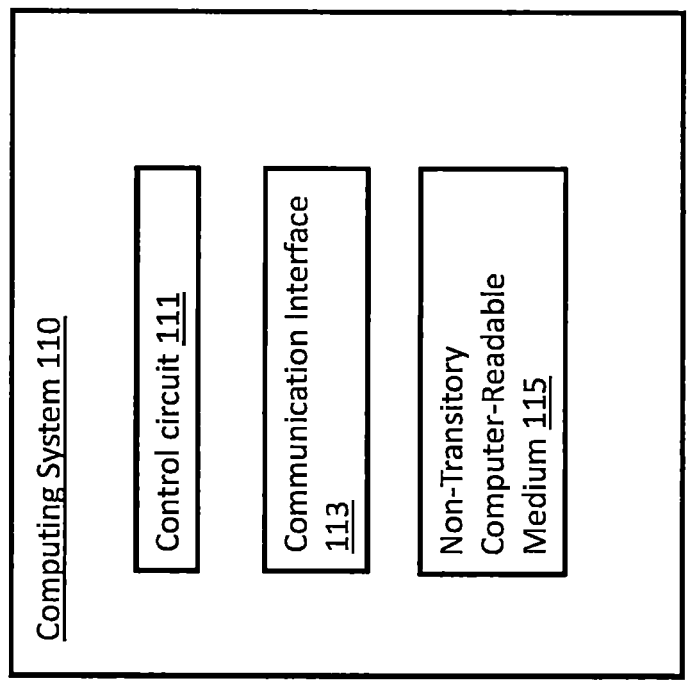
FIG. 2 depicts a block diagram of a computing system configured to determine occlusion within a camera field of view, according to an embodiment herein.

FIG. 2 depicts a block diagram of the computing system 110. As illustrated in the block diagram, the computing system 110 may include a control circuit 111, a communication interface 113, and a non-transitory computer-readable medium 115 (e.g., memory or other storage device). In an embodiment, the control circuit 111 may include one or more processors, a programmable logic circuit (PLC) or a programmable logic array (PLA), a field programmable gate array (FPGA), an application specific integrated circuit (ASIC), or any other control circuit.

In an embodiment, the communication interface 113 may include one or more components that are configured to communicate with the camera 170/180 of FIGS. 1A-1C and/or the robot 150 of FIG. 1C. For instance, the communication interface 113 may include a communication circuit configured to perform communication over a wired or wireless protocol. As an example, the communication circuit may include a RS-232 port controller, a USB controller, an Ethernet controller, an IEEE 802.11 controller, a Bluetooth® controller, a PCI bus controller, any other communication circuit, or a combination thereof.

In an embodiment, the non-transitory computer-readable medium 115 may include an information storage device, such as computer memory. The computer memory may include, e.g., dynamic random access memory (DRAM), solid state integrated memory, and/or a hard disk drive (HDD). In some cases, determining the occlusion within the camera field of view may be implemented through computer-executable instructions (e.g., computer code) stored on the non-transitory computer-readable medium 115. In such cases, the control circuit 111 may include one or more processors configured to execute the computer-executable instructions to detect occlusion in the camera field of view (e.g., the steps illustrated in FIGS. 4A and 4B). In an embodiment, the non-transitory computer-readable medium may be configured to store camera data that were generated by the camera 170/180 and received directly or indirectly from the camera 170/180. In such an embodiment, the computing system 110 may be configured to receive or otherwise access the camera data from the non-transitory computer-readable medium 115. In some cases, the non-transitory computer-readable medium 115 may store an object recognition template, which is discussed below in more detail.

Figure 3A:
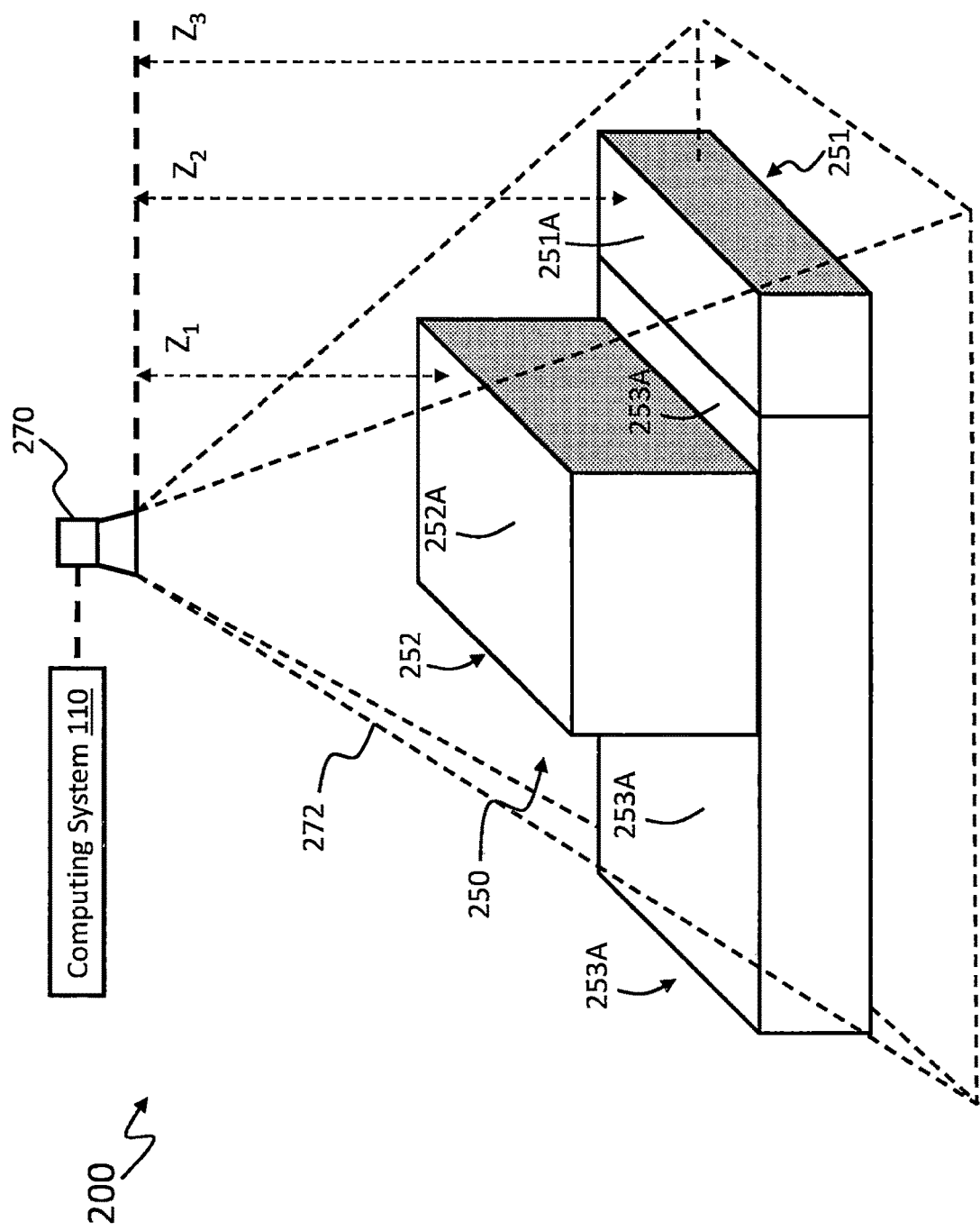
FIGS. 3A and 3B depict systems in which camera occlusion may be detected for an object structure within a camera field of view, according to an embodiment herein.

FIG. 3A depicts an example in which the computing system 110 is part of a system 200 for detecting occlusion in a camera field of view. The system 200 may be an embodiment of the system 100/100A, and includes the computing system 110 of FIGS. 1A-1B as well as a camera 270, which may be an embodiment of the camera 170. As depicted in FIG. 3A, the camera 270 (which may also be referred to as a first camera 270) may be in communication with the computing system 110, and may have a field of view (also referred to as a camera field of view) 272. The camera field of view 272 may form an imaginary pyramid, as illustrated in FIG. 3A, or may form some other shape, such as a cone. An apex of the pyramid, cone, or other shape of the camera field of view 272 may be located at the camera 270, such as at a location of a lens or image sensor (if any) of the camera 270.

In an embodiment, the camera 270 may be configured to generate camera data that captures or, more generally, represents one or more objects that are at least partially within the camera field of view 272. For example, FIG. 3A illustrates a stack 250 of a plurality of objects 251-253 that are at least partially in the camera field of view 272. In the example of FIG. 3A, the plurality of objects include a first object 251, a second object 252, and a third object 253. The objects 251-253 may be, e.g., boxes to be de-palletized, or may be any other objects. In an embodiment, the stack 250 may include multiple layers. For example, the stack 250 may include a first layer formed by the first object 251 and the third object 253, and a second layer formed by the second object 252. An object (e.g., 252) of the second layer may be stacked on at least one object (e.g., 253) of the first layer (e.g., the second object 252 may be stacked on top of the third object 253). In such an arrangement, one or more objects (e.g., 252) of the second layer may be closer to the camera 270 relative to a distance between the camera 270 and one or more objects (e.g., 251) of the first layer, because the second layer is disposed between the camera 270 and the first layer. For example, FIG. 3A depicts a depth value of $Z_1$, relative to the camera 270, for a surface 252A (e.g., top surface) of the second object 252, wherein the depth value may refer to a distance between the camera 270 and the surface 252A. The depth value of $Z_1$ for the surface 251A may be smaller than a depth value of $Z_2$, which may be a depth value of a surface 251A (e.g., top surface) for the first object and/or a depth value of a surface 253A of the third object 253. FIG. 3A further depicts a depth value of $Z_3$, which may be a depth value of a surface of, e.g., a floor on which the stack 250 is placed, or another layer (e.g., a lower layer) of the stack 250 that is farther from the camera 270.

In an embodiment, the camera data generated by the camera 270 may describe a structure of the stack 250, which may also be referred to as a stack structure for the stack 250. The stack structure may be formed from at least a structure of an object (also referred to as an object structure) of the stack. For instance, the stack structure for the stack 250 may be formed from at least an object structure for the first object 251 (which refers to a structure of the first object 251), an object structure for the second object 252, and an object structure for the third object 253. In some cases, the camera data may describe the stack structure with 3D information that describes respective depth values of locations on one or more surfaces of the stack 250 relative to the camera 270. For example, the 3D information may include a plurality of 3D data points (e.g., 3D coordinates) that describe respective locations on one or more surfaces (e.g., 251A, 252A, 253A) of the stack 250, or more specifically one or more surfaces of the stack structure for the stack 250. Because the stack 250 is formed from the objects 251-253, the plurality of 3D data points may also be describing respective locations on one or more surfaces of the objects 251-253, or more specifically of their object structures. The plurality of 3D data points may indicate, e.g., a depth value of $Z_1$, $Z_2$, or $Z_3$ for those locations. In some cases, the camera data may include 2D information, such as an image that captures or otherwise represents an appearance of the stack 250. The image may show a feature (e.g., corner or edge) of the stack structure and/or an object structure, as discussed below in more detail.

Figure 3B:
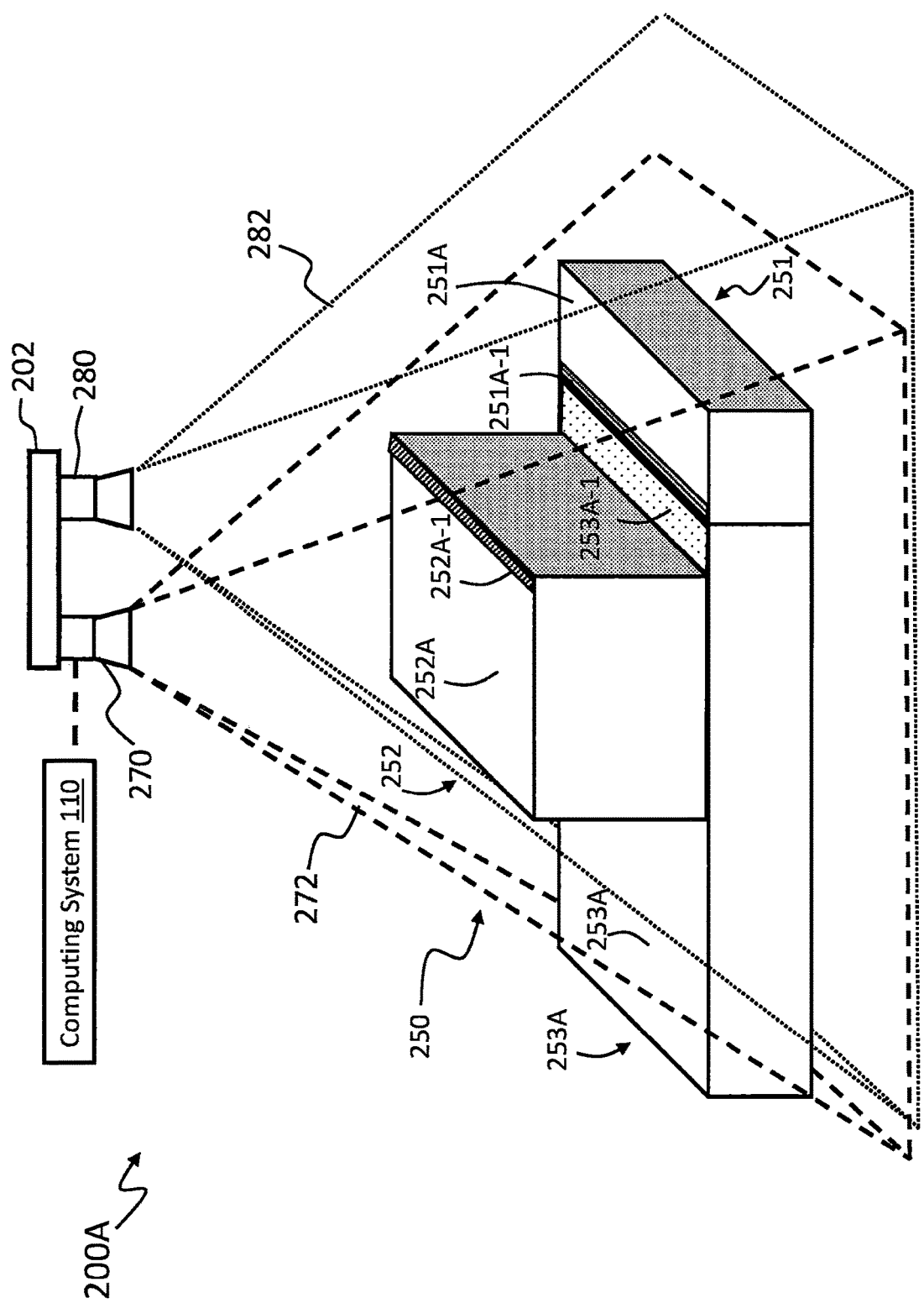

In an embodiment, the system 200 may have two or more cameras. For instance, FIG. 3B depicts an example system 200A, which may be an embodiment of the system 100/100A/100B/200. The system 200A includes the camera 270 and a camera 280, which may also be referred to as the first camera 270 and the second camera 280, respectively. The first camera 270 may be an embodiment of the first camera 170 of FIGS. 1A-1C, and the second camera 280 may be an embodiment of the second camera 180 of FIGS. 1B-1C. Like in FIG. 3A, the first camera 270 may have a camera field of view 272. The second camera 280 may have a second camera field of view 282 that overlaps at least partially with the camera field of view 272. In some aspects, the camera field of view 272 of the first camera 270 may substantially overlap with the camera field of view 282 of the second camera 280, such that the first camera 270 and the second camera 280 may each generate camera data that capture substantially the same portion of the stack structure for the stack 250. In an embodiment, the first camera 270 and the second camera 280 may be different types of cameras. For instance, the first camera 270 may be a 3D camera, while the second camera 280 may be a 2D camera, or vice versa. In other embodiments, the first camera 270 and the second camera 280 may be the same type of camera.

In an embodiment, the computing system 110 may be configured to access or otherwise receive information which describes a spatial relationship (e.g., relative location and orientation) between the first camera 270 and the second camera 280. For instance, this information may have been previously determined by the computing system 110 (e.g., via a stereo camera calibration operation), or may have been previously determined manually and stored in the non-transitory computer-readable medium 115 of the computing system 110 or on another device. As an example, the information may be a transformation matrix which describes a translation and rotation between a coordinate system of the first camera 270 and a coordinate system of the second camera 280. In some cases, the computing system 110 may be configured to use the information regarding the spatial relationship between the first camera 270 and the second camera 280 so as to place camera data generated by the first camera 170 and camera data generated by the second camera 280 in a common reference frame, such as a common coordinate system. For instance, as discussed below in more detail, if the computing system is using the camera data from the second camera 280 to determine a location of a feature of the stack structure, the computing system 110 may be configured to compensate for any difference between a reference frame of the camera 280 and the common reference frame. In some cases, the common reference frame may be a reference frame of one of the cameras, such as the first camera 270.

In an embodiment, the first camera 270 and second camera 280 may have a substantially fixed spatial relationship. For instance, FIG. 3B illustrates a mounting structure 202 to which the first camera 270 and the second camera 280 are both fixedly attached. The fixed attachment may cause the first camera 270 and the second camera 280 to be fixed relative to each other in terms of relative location and orientation.

In an embodiment, a location in a camera's field of view (e.g., 272) may be occluded from view because a line of sight between that location and the camera (e.g., 270) may be blocked, or may be close to being blocked, by an object or portion thereof in the camera's field of view. In other words, the object or portion thereof may obstruct that location, or a portion of a region surrounding the location, from being viewed by the camera, or come close to doing so. In an embodiment, the object may prevent light or other signal, which may be used to sense information about that location, from directly reaching the camera, or may significantly distort the signal. In FIGS. 3A and 3B, a portion of the stack 250, or more specifically of the stack structure, may be occluded relative to the camera 270 by another portion of the stack structure. For example, as depicted in FIG. 3B, locations that are in a region 251A-1 on a surface 251A of the first object 251 or in a region 253A-1 on a surface 253A1 of the third object 253A may be occluded from the camera 270 by the second object 252, or more specifically by a portion thereof occupied by region 252A-1. In some instances, the occlusion may be due to positioning of the camera 270 and of the objects 251-253 of the stack 250 relative to the camera 270 and to each other. The occlusion may cause the camera data generated by the camera 270 to provide an incomplete description of the stack 250, or more specifically of its stack structure. For example, if the camera data generated by the camera 270 includes a plurality of 3D data points, those 3D data points may provide little to no information regarding region 251A-1 and region 253A-1. If the camera data generated by the camera 270 includes a 2D image, the 2D image may not show or otherwise represent the region 251A-1 and region 253A-1. While the above discussion relates to occlusion of a location relative to the camera 270, one or more locations of the stack structure for the stack 250 in FIG. 3B may also be occluded relative to the camera 280.

Figure 4A:
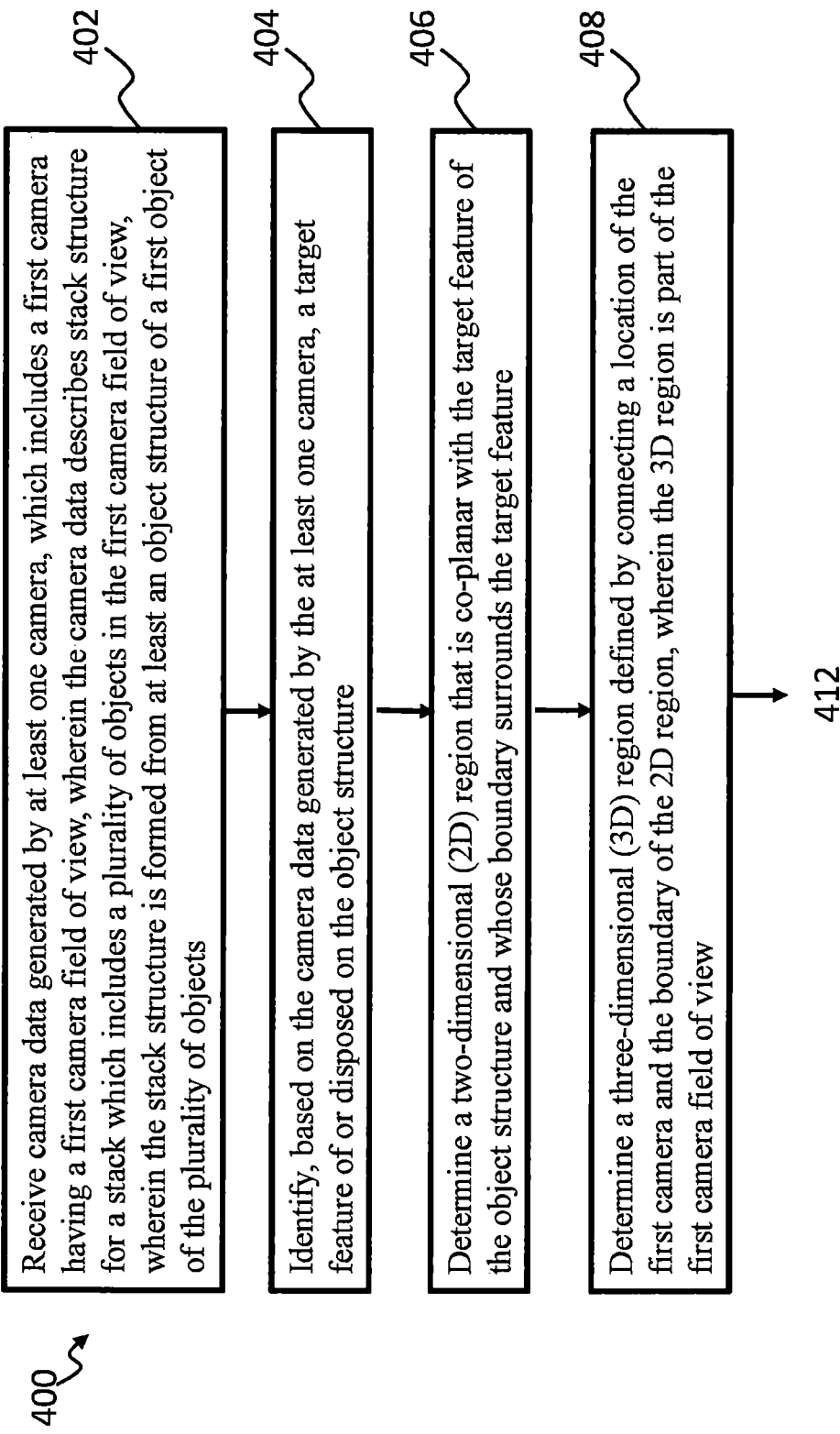
FIGS. 4A-4B depict a flow diagram of an example method for determining occlusion within a camera field of view, according to an embodiment hereof.
Figure 4B:
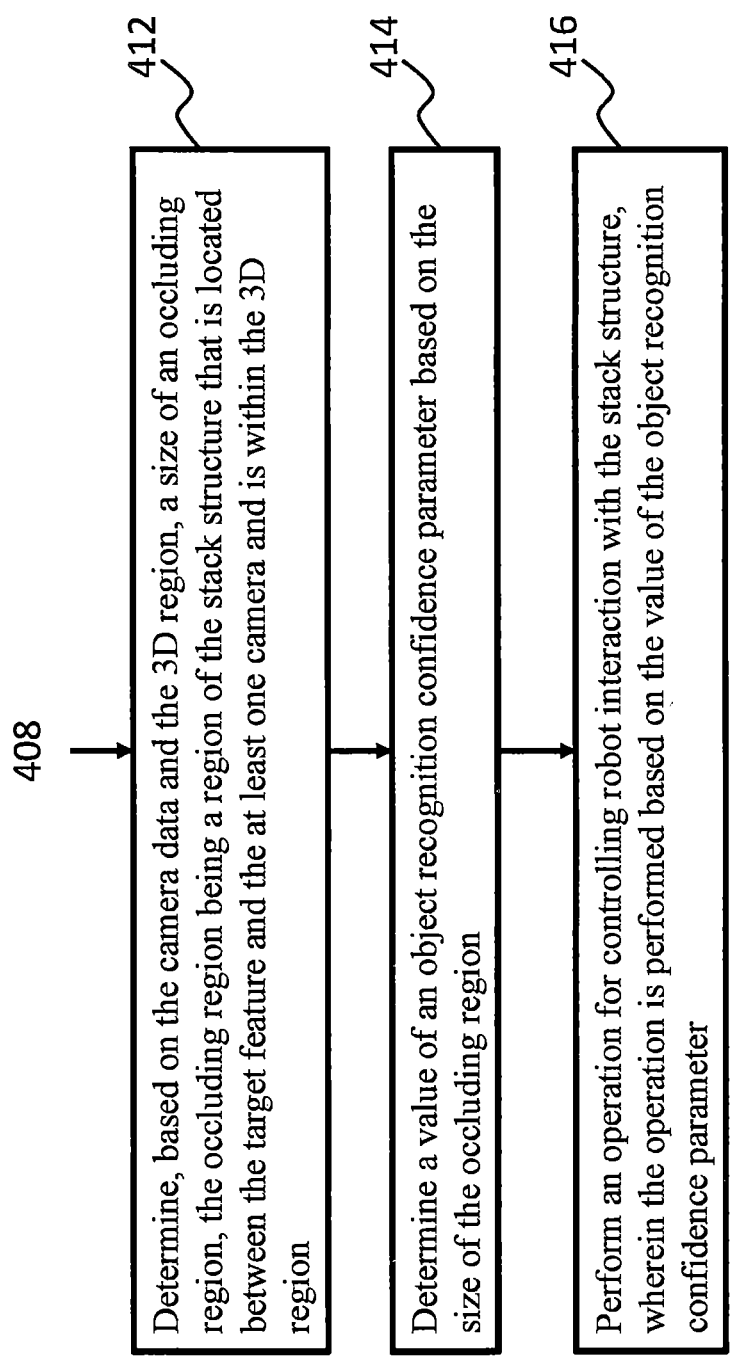

In an embodiment, occlusion of one or more locations in a camera's field of view may affect robot interaction with objects in the field of view, because the robot interaction may depend on camera data that describe, e.g., location, size, and/or orientations of the objects relative to a robot. In some cases, the robot interaction may entail performing object recognition to recognize the objects in the field of view, and the occlusion may affect an accuracy of object recognition. Thus, some aspects of the embodiments herein relate to detecting or otherwise determining occlusion within a camera field of view. Such a determination may be used to, e.g., evaluate object recognition that may have been performed while there was occlusion in the camera field of view, to control how object recognition is performed, and/or to control robot interaction with objects in the camera field of view. FIGS. 4A and 4B depict an example method 400 for determining occlusion within a camera field of view. The method 400 may be performed by a computing system, such as by the control circuit 111 of the computing system 110 of FIGS. 1A-1C and FIG. 2.

In an embodiment, the control circuit 111 may be configured to perform the method 400 when the communication interface 113 of the computing system 110 is in communication with at least one camera, wherein the at least one camera includes a first camera (e.g., 170/270) having a first camera field of view (e.g., 272). As an example, the method 400 may be performed for the situations depicted in FIGS. 3A, 3B, 5A-5D, 6A-6E, and 7A-7C, which involves the first camera 270, the second camera 280, and the computing system 110 in communication with the cameras 270/280. In another example, the method 400 may be performed for situations in which the at least one camera includes the first camera 270, and in which the second camera 280 is not present.

In an embodiment, the method 400 may be performed further when a stack having a plurality of objects is in a first camera field of view (e.g., 272) of the first camera (e.g., 270). For instance, the control circuit 111 may perform the method 400 when, e.g., the stack 250 of objects 251-253 of FIGS. 3A, 3B, 5A, and 6A are in the first camera field of view 272 of the first camera 270, or when a stack 750 of objects 751-753 of FIG. 7A are in the first camera field of view 272 of the first camera 270. As stated above, the stack structure for the stack 250 in FIGS. 5A and 6A may be formed from at least an object structure for the first object 251 (wherein the object structure refers to a structure of the object), as well as from an object structure for the second object 252 and the object structure for the third object 253. Similarly, the stack structure for the stack 750 of FIG. 7A may be formed from at least an object structure for a first object 751, as well as from an object structure for a second object 752, and an object structure for a third object 753.

In an embodiment, the method 400 may begin with or otherwise include a step 402, in which the control circuit 111 receives camera data generated by at least one camera, which includes a first camera (e.g., 170/270) having a first camera field of view (e.g., 272), wherein the camera data describes stack structure for the stack (e.g., 250/750 of FIGS. 5A, 6A, and 7A), wherein the stack structure may refer to a structure of the stack. In some scenarios, the at least one camera may include the first camera (e.g., 170/270) and a second camera (e.g., 180/280). In such scenarios, the camera data received by the control circuit in step 402 may include both camera data generated by the first camera (e.g., 170/270) and camera data generated by the second camera (e.g., 180/280).

As stated above, in some cases the camera data received by the control circuit 111 in step 402 may include 3D information that includes depth information regarding a scene in the first camera field of view. The depth information may indicate, e.g., depth values of respective locations on the stack structure, wherein the depth values may be relative to the first camera (e.g., 270). In some cases, the depth information may include a plurality of 3D data points that describe the depth values. For example, each of the plurality of 3D data points may be a 3D coordinate, such as a $[X\ Y\ Z]^T$ coordinate that describe a corresponding location on a surface of the stack (which may also be referred to as a surface of the stack structure). In this example, the Z-component of the 3D data point may be a depth value of the corresponding location represented by the 3D data point. In some cases, the plurality of 3D data points may form a point cloud that describes respective locations on one or more surfaces of the stack structure for the stack (e.g., 250/750). As further stated above, in some cases the camera data received in step 402 may include a 2D image of the stack (e.g., 250/750), or more specifically of the stack structure. The 2D image may include, e.g., a plurality of pixels corresponding to pixel coordinates $[u\ v]^T$.

In an embodiment, the method 400 may include a step 404, in which the control circuit 111 may identify, based on the camera data generated by the at least one camera, a target feature of or disposed on the object structure for an object (which may also be referred to as a target feature of the object). As an example, the object structure may be a structure of the first object 251 of FIGS. 5A and 6A, or a structure of the first object 751 of FIG. 7A.

In an embodiment, the target feature may be any feature (e.g., characteristic) of the object that is used by the computing system 110 to perform object recognition for an object (e.g., 251 of FIG. 5A or 751 of FIG. 7A), and/or to plan robot interaction with the object. As discussed in more detail below, in some cases the control circuit 111 may be configured to identify the target feature based on information in an object recognition template, which may describe, e.g., a size (e.g., dimensions) of the object structure, a shape of the object structure, and/or a visual feature appearing on a surface of the object structure.

In an embodiment, the target feature of or disposed on an object structure (which may also be referred to as a target feature of an object) may be at least one of: a corner of the object structure for an object, an edge of the object structure, a visual feature disposed on a surface of the object structure, or an outline of the surface of the object structure. The above features may also be referred to as a corner of the object, an edge of the object, a visual feature disposed on the surface of the object, or an outline of the surface of the object.

Figure 5A:
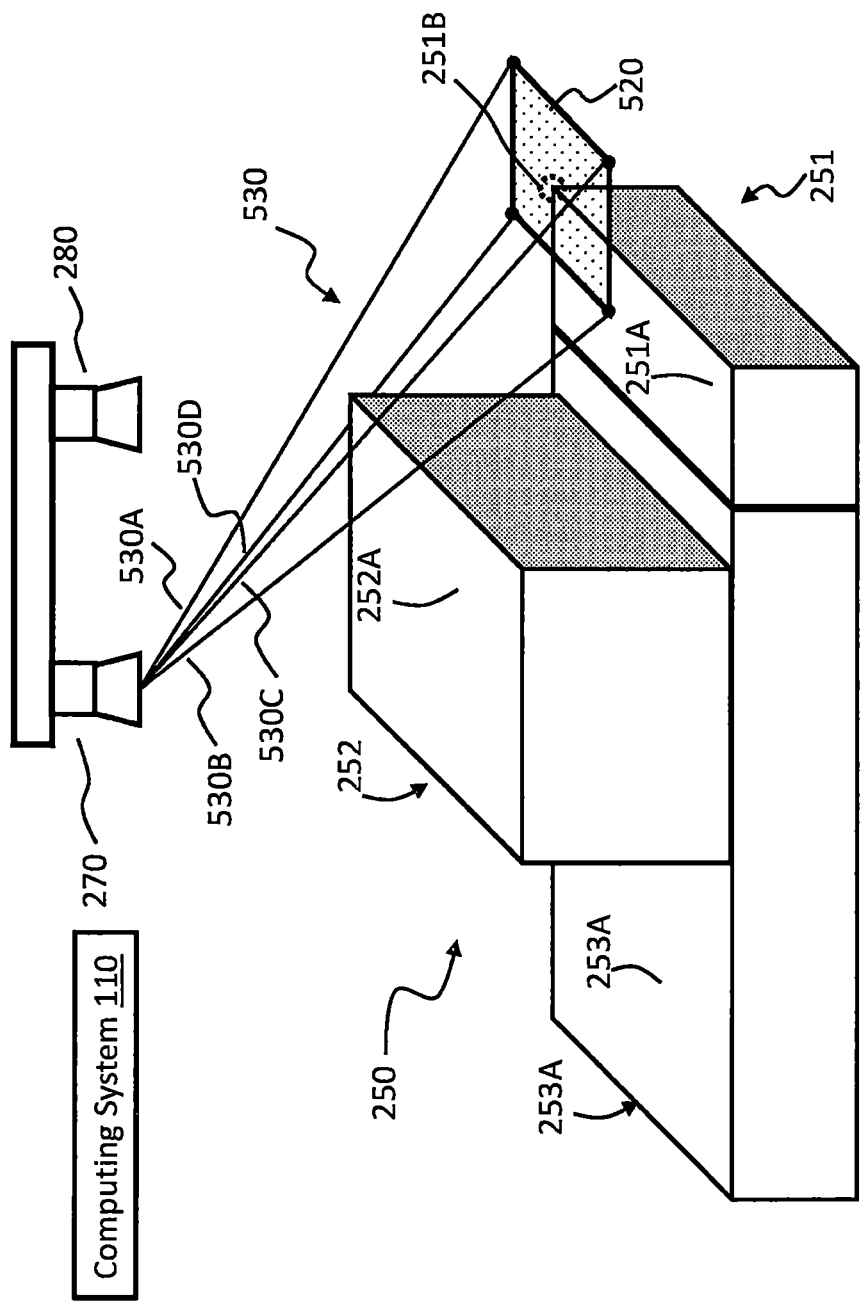
FIGS. 5A-5D depict an embodiment in which occlusion is determined based on a target feature that is a corner of an object structure, according to an embodiment hereof.
Figure 5B:
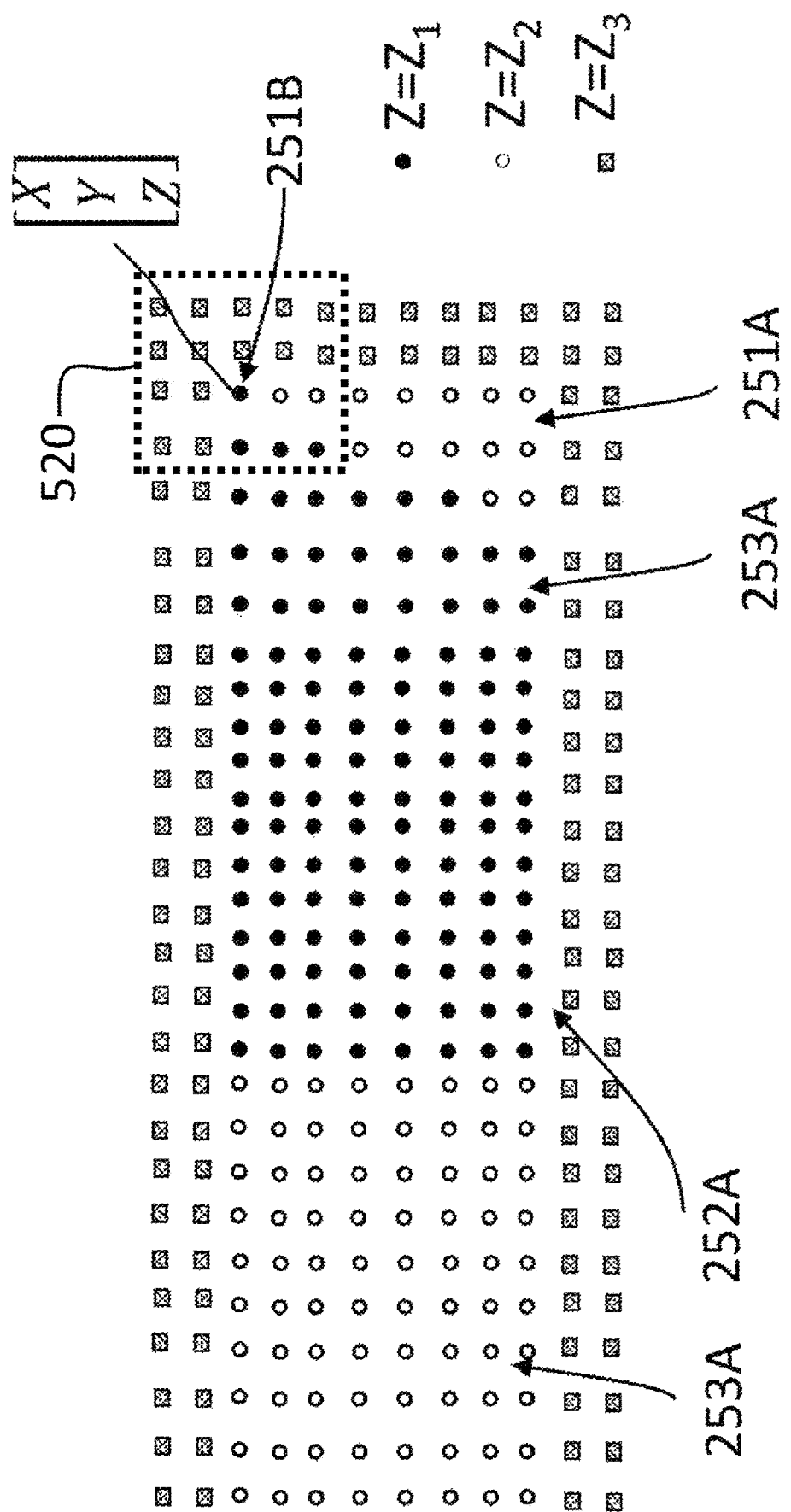

More particularly, some embodiments of identifying the target feature in step 404 may involve identifying, as the target feature, a corner of an object structure, such as a corner 251B of the object structure for the first object 251 in FIG. 5A (which may also be referred to as a corner 251B of the first object 251). In some cases, the control circuit 111 of the computing system 110 may be configured to identify the corner 251B based on 3D information from the camera data generated by the first camera 270 and/or the camera data generated by the second camera 280 of FIG. 5A. FIG. 5B provides an example of 3D information that includes a plurality of 3D data points which indicate respective depth values of locations on one or more surfaces in the camera field of view 272 (or 282) of the camera 270 (or of the camera 280) of FIGS. 3A, 3B, and 5A. For instance, the plurality of 3D data points may include a first set of 3D data points which indicate a depth value of $Z_1$ for each of one or more locations (indicated by the black circles in FIG. 5B) on the surface 252A of the second object 252 relative to the camera 270/280. The plurality of 3D data points may further include a second set of data points which indicate a depth value of $Z_2$ for each of one or more locations (indicated by the white circles of FIG. 5B) on the surface 251A of the first object 251 and of the surface 253A of the third object 253 relative to the camera 270/280. As illustrated in FIG. 5B, because part of the camera field of view 272 (or 282) of the camera 270 (or of the camera 280) is occluded by the top left edge of the second object 252, the black circles on the right side may not form a vertical line. The depth value of $Z_1$ (indicated by the black circles) and the depth value of $Z_2$ (indicated by the white circles) may be distributed, as illustrated in FIG. 5B. The plurality of 3D data points may further include a third set of 3D data points which indicate a depth value of $Z_3$ for each of one or more locations of one or more additional surfaces, which may correspond to, e.g., a floor that surrounds the stack 250 of FIG. 5A, or to any other surface on which the first object 251 and the third object 253 are disposed. As stated above, each of the plurality of 3D data points may in some embodiments be a 3D coordinate, such as a [X Y Z]. In such an embodiment, the depth value may be indicated by, e.g., a Z-component of the 3D coordinate.

In an embodiment, the control circuit 111 may be configured to identify the corner 251B based on identifying a convex corner or fused corner based on the plurality of 3D data points of FIG. 5B. Identifying a convex corner or fused corner is discussed in more detail in U.S. patent application Ser. No. 16/578,900, entitled "Method and Computing System for Object Identification," which is incorporated by reference herein in its entirety. In an embodiment, the control circuit 111 may be configured to identify the corner 251B by identifying 3D data points which represent a region having substantially a first depth value for one quarter of the region and a second depth value (e.g., a higher depth value) for the remaining three quarters of the region. In some cases, the corner 251B may be identified as a center of the region.

In an embodiment, identifying the corner 251B may involve determining its location, such as determining a coordinate $[X\ Y\ Z]^T$ based on the camera data, as illustrated in FIG. 5B. In some cases, the control circuit 111 may determine the coordinate relative to a common reference frame, as discussed above. As an example, the common reference frame may be a coordinate system of the first camera 270 of FIG. 5A. In some cases, if the coordinate $[X\ Y\ Z]^T$ is based on the camera data generated by the first camera 270, then the coordinate may already be in the common reference frame. In such cases, the coordinate $[X\ Y\ Z]^T$ may be used for other steps of method 400, such as step 406. In some cases, if the coordinate $[X\ Y\ Z]^T$ is initially based on the camera data generated by the second camera 280 of FIG. 5A, then the coordinate may initially be expressed relative to a reference frame (e.g., coordinate system) of the second camera 280. In such a situation, the control circuit 111 may be configured to generate an adjusted coordinate $[X'\ Y'\ Z']^T$ that accounts for a difference in location and/or orientation between a reference frame of the first camera 270 and the reference frame of the second camera 280. For instance, the control circuit 111 may be configured to generate the adjusted coordinate $[X'\ Y'\ Z']^T$ by applying a transformation matrix to the coordinate $[X\ Y\ Z]^T$, wherein the transformation matrix describes the spatial relationship between the first camera 270 and the second camera 280, as discussed above. In some instances, the first camera 270 and the second camera 280 may be co-planar, which may cause Z' to be equal to Z. In the above example, the adjusted coordinate $[X'\ Y'\ Z']^T$ may be used in other steps of the method 400, such as step 406.

Figure 5C:
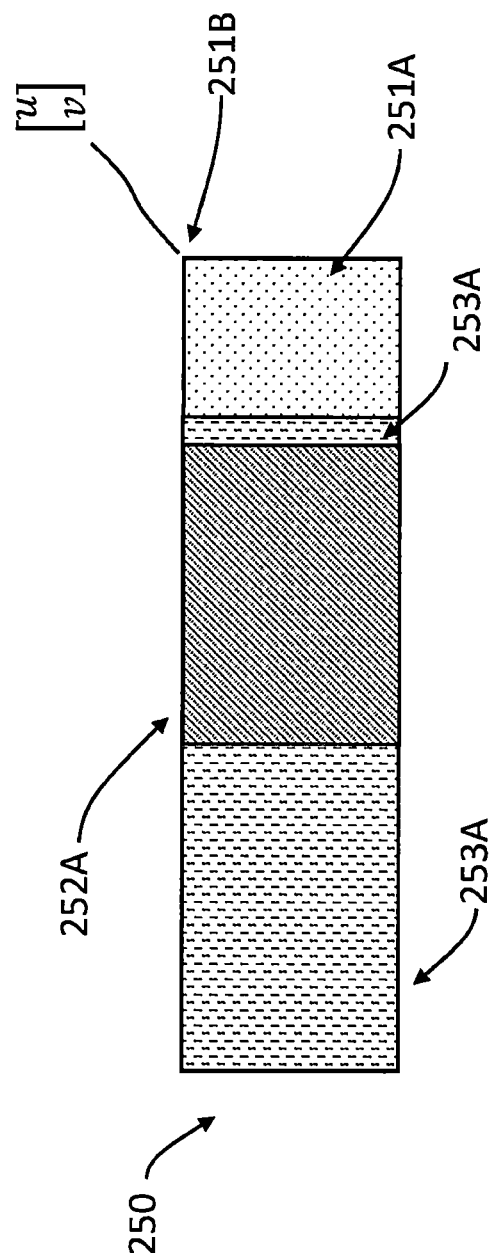

In an embodiment, the control circuit 111 of the computing system 110 may be configured to identify the corner 251B of FIG. 5A based on 2D information, which may be from the camera data generated by the first camera 270 or camera data generated by the second camera 280 of FIG. 5A. For instance, the second camera 280 may in some instances be a 2D camera that is configured to generate a 2D image. FIG. 5C depicts an example 2D image of the stack 250 of FIG. 5A. In this example, the surface 251A of the object structure for the first object 251, the surface 252A of the object structure for the second object 252, and the surface 253A of the object structure for the third object 253 appears in the 2D image. The control circuit 111 may be configured to, e.g., identify the corner 251B from the 2D image of FIG. 5C, such as by determining a pixel coordinate $[u\ v]^T$ at which the corner 251B appears in the image, and converting the pixel coordinate to a 3D coordinate $[X\ Y\ Z]^T$. In some cases, the pixel coordinate $[u\ v]^T$ may be identified as an intersection between two lines in the image, wherein the two lines represent two respective outer edges of the object structure for the first object 251. In an embodiment, converting the pixel coordinate $[u\ v]^T$ to the 3D coordinate $[X\ Y\ Z]^T$ may be based on, e.g., an inverse projection matrix $K^{-1}$ (and/or any other camera calibration information) of the camera that generated the 2D image, such as the first camera 270 or the second camera 280. In some cases, the conversion may further be based on 3D information that is generated by the same camera, or by a different camera. In some instances, the control circuit 111 may be configured to further adjust the 3D coordinate $[X\ Y\ Z]^T$ so as to express the 3D coordinate in a common reference frame, as discussed above.

Figure 6A:
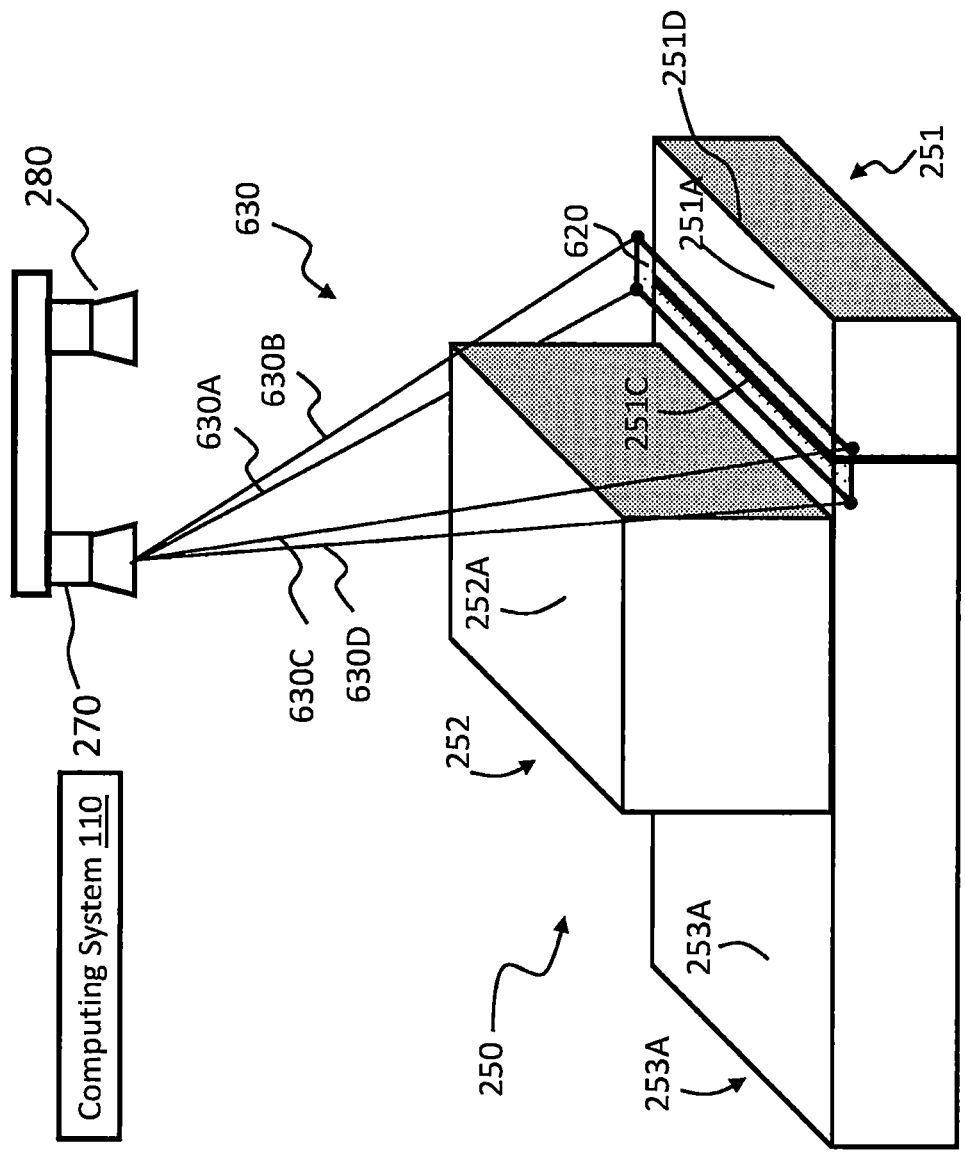
FIGS. 6A-6E depict an embodiment in which occlusion is determined based on a target feature that is an edge of an object structure, according to an embodiment hereof.
Figure 6B:
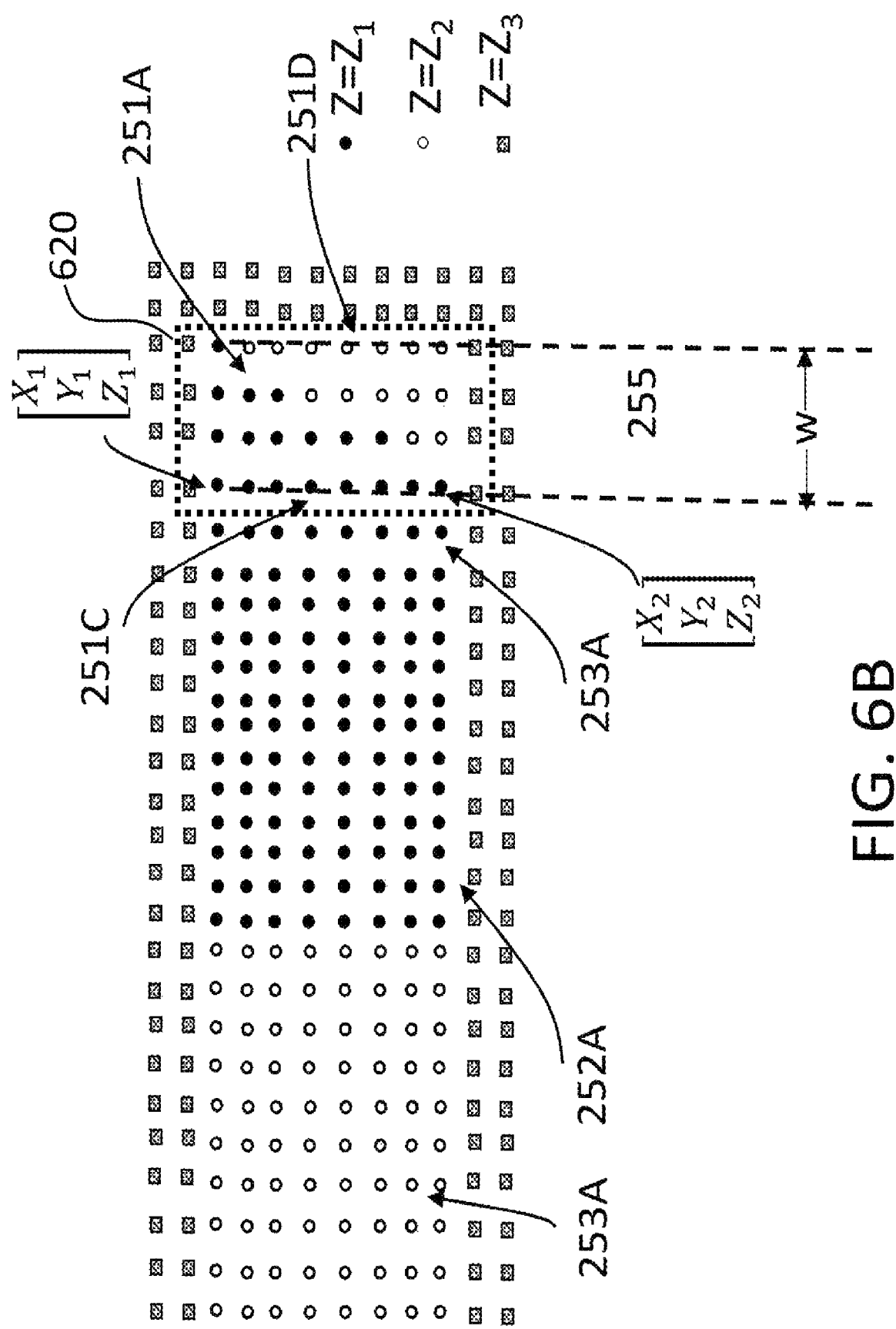
Figure 7A:
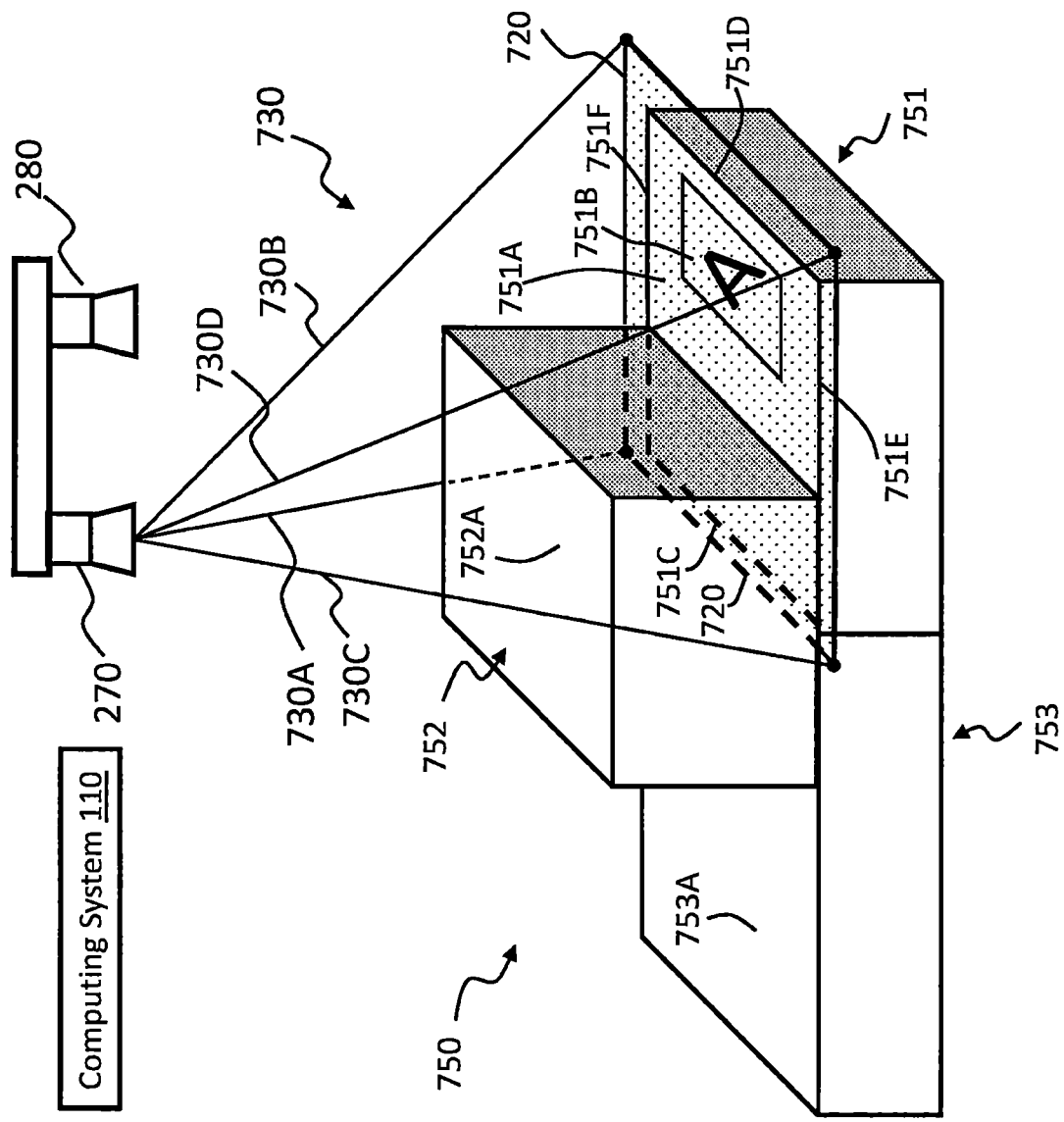

As stated above, some embodiments of identifying the target feature in step 404 may involve identifying, as the target feature, an edge of an object structure, such as the edge 251C of the object structure for the first object 251 in FIG. 6A (which may also be referred to as the edge 251C of the first object 251). In some cases, the control circuit 111 of the computing system 110 may be configured to identify the edge 251C based on 3D information, which may be from the camera data generated by the first camera 270 and/or camera data generated by the second camera 280 of FIG. 6A. For example, FIG. 6B depicts 3D information that includes a plurality of 3D data points. The plurality of 3D data points depicted in FIG. 6B may be substantially the same as that of FIG. 5B. In the example of FIG. 6B, the control circuit 111 may be configured to identify the edge 251C of the object structure for the first object 251 based on the 3D information and based on an object recognition template. The object recognition template may facilitate object recognition for the first object 251 by describing, e.g., a size of the object structure for the first object 251, and/or describes other characteristics of the first object 251 which may be used to perform object recognition. For example, the object recognition template may indicate that the object structure for the first object 251 has a length L and a width W. In such an example, the control circuit 111 may be configured to identify the edge 251C in FIG. 6B by identifying, e.g., an outer edge 251D of FIGS. 6A and 6B based on the plurality of 3D data points, and identifying the edge 251C as a set of locations (e.g., $[X_1\ Y_1\ Z_1]^T$ and $[X_2\ Y_2\ Z_2]^T$) which are offset from the outer edge 251D by the width W of the object structure, which is identified in the object recognition template. In some cases, the control circuit 111 may be configured to identify the outer edge 251D of FIG. 6A by determining a set of locations at which there is a discontinuity in depth values (e.g., a discontinuity from $Z_2$ to $Z_3$ as illustrated in FIG. 3A). As illustrated in FIG. 6B, because part of the camera field of view 272 (or 282) of the camera 270 (or of the camera 280) is occluded by the top edge of the second object 252, the black circles on the right side may not form a vertical line. The depth value of $Z_1$ (indicated by the black circles) and the depth value of $Z_2$ (indicated by the white circles) may be distributed, as illustrated in FIG. 6B.

Figure 6C:
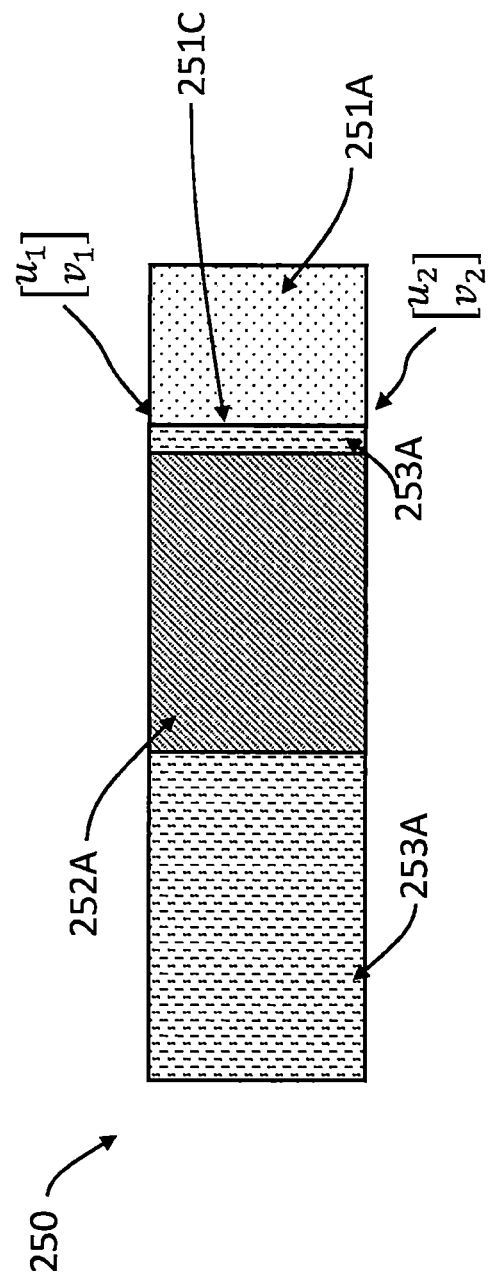

In some cases, the control circuit 111 of the computing system 110 may be configured to identify the edge 251C based on 2D information, which may be from the camera data generated by the first camera 270 and/or camera data generated by the second camera 280 of FIG. 6A. For instance, FIG. 6C depicts a 2D image of the stack 250 of FIG. 6A. The 2D image of FIG. 6C may be substantially the same as that of FIG. 5C. In an embodiment, the control circuit 111 may be configured to identify from the 2D image one or more pixel coordinates at which the edge 251C appears in the image of FIG. 6C. For instance, the control circuit 111 may identify a first pixel coordinate $[u_1\ v_1]^T$ which represents a location at which a first endpoint of the edge 251C appears in the 2D image of FIG. 6C, and identify a second pixel coordinate $[u_2\ v_2]^T$ which represents a location at which a second endpoint of the edge 251C appears in the 2D image. In some cases, the control circuit 111 may be configured to convert the first pixel coordinate $[u_1\ v_1]^T$ and the second pixel coordinate $[u_2\ v_2]^T$ to a first 3D coordinate $[X_1\ Y_1\ Z_1]^T$ and a second 3D coordinate $[X_2\ Y_2\ Z_2]^T$, respectively, as discussed above with respect to FIG. 5C.

As stated above, some embodiments of identifying the target feature in step 404 may involve identifying, as the target feature, a visual feature disposed on a surface of the object structure. In an embodiment, a visual feature may include a graphical element, or any other visual marking. For instance, FIG. 7A depicts a visual feature 751B on a surface 751A of an object structure for a first object 751 (which may also be referred to as a visual feature 751B disposed on a surface 751A of the first object 751). More particularly, FIG. 7A depicts a situation in which a stack 750 of objects 751-753 are in a camera field of view 272 of the first camera 270 and/or in a camera field of view 282 of the second camera 280. The first object 751 and the third object 753 may form a first layer of the stack 750, while the second object 752 may form a second layer of the stack 750, and may be stacked on the first object 751 and on the third object 753. As stated above, the first object 751 may have a visual feature 751B disposed on a surface 751A of the first object 751. In the example of FIG. 7A, the visual feature 751B may be a logo displaying a brand name or trademark (e.g., "A"), and may be printed on or attached to the surface 751A of the object structure for the first object 751.

In an embodiment, the control circuit 111 of the computing system 110 may be configured to identify the visual feature 751B based on 2D information (e.g., a 2D image), which may be from the camera data generated by the first camera 270 and/or the camera data generated by the second camera 280 of FIG. 7A. For example, FIG. 7B depicts the visual feature 751B appearing in a 2D image of the stack 750. More particularly, the surface 751A (e.g., top surface) of the first object 751, the surface 752A of the second object 752, and the surface 753A of the third object 753 may appear in the image depicted in FIG. 7B.

In an embodiment, the control circuit 111 may be configured to identify the visual feature 751B by determining whether any portion of the 2D information (e.g., 2D image) of FIG. 7B matches an appearance or other characteristic of a defined visual feature. For instance, the control circuit 111 may perform pattern recognition to attempt to recognize whether any portion of the 2D image of FIG. 7B matches a shape, marking, pattern, color, or any other aspect of the appearance of the defined visual feature. In an embodiment, information for the defined visual feature may be stored in the non-transitory computer-readable medium 115. In an embodiment, information for the defined visual feature may be stored in an object recognition template. As stated above, the object recognition template may facilitate object recognition for a particular object or category of objects by describing its characteristics, such as a size (e.g., dimensions) of an object structure for the object or category of objects, a shape of the object structure, and/or an appearance of a surface of the object structure, such as a visual feature disposed on the surface of the object structure. For instance, the object recognition template may include information which describes the "A" logo as a visual feature appearing on a surface (e.g., 751A) of the first object 751 or of a category of objects to which the first object 751 belongs. In such an instance, the control circuit 111 may be configured to identify the visual feature 751B by determining whether any portion of the of the 2D image of FIG. 7B matches the information stored in the object recognition template for describing the "A" logo.

In an embodiment, identifying the target feature in step 404 may involve identifying, as the target feature, an outline of a surface of an object structure. The outline may describe a boundary of the surface of the object structure. For example, the control circuit 111 may identify the outline of the object structure for the first object 751 in FIG. 7A by identifying all four edges 751C-751F of the surface 751A of the object structure for the first object 751. In other words, the four edges 751C-751F may form an outline of the surface 751A. In some cases, the control circuit 111 may identify the edges 751C-751F based on a defined size of the object structure for the first object 751, such as a defined size described in an object recognition template. The defined size may indicate, e.g., dimensions of the object structure, such as a length and width. For example, the control circuit 111 may be configured to identify at least one of the edges 751C-751F based on 2D information or 3D information in the camera data generated by the camera 270/280, and may identify remaining ones of the edges 751C-751F based on the defined size of the object structure for the first object 751.

Referring back to FIGS. 4A-4B, the method 400 may further include a step 406, in which the control circuit 111 determines a 2D region that is co-planar with the target feature and whose boundary surrounds the target feature. The 2D region may be, e.g., a 2D region having a rectangular shape (e.g., a square shape), a circular shape, a hexagonal shape, or any other 2D shape. In some cases, the 2D region may be referred to as an occlusion analysis region, because it is used to determine an occluding region, as discussed below in more detail.

As an example, FIG. 5A depicts the corner 251B as the target feature, and depicts a 2D region 520 (e.g., a square region) that is co-planar with the corner 251B and whose boundary surrounds the corner 251B. More particularly, the corner 251B may be a corner of the surface 251A of an object structure for the first object 251, and the 2D region 520 may be co-planar with that surface 251A. Further, the corner 251B may be located inside the 2D region 520. The 2D region 520 may be a square region, but can be modified to be, e.g., a rectangular region or circular region. In some cases, the control circuit 111 may determine the 2D region 520 as a region having: (i) a defined size and (ii) a center that is located at the corner 251B. The 2D region 520, which is co-planar with the corner 251B and whose boundary surrounds the corner 251B, is also illustrated in the 3D depth map of FIG. 5B.

As another example, FIG. 6A depicts the edge 251C as the target feature, as discussed above, and depicts a 2D region 620 (e.g., rectangular region) that is co-planar with the edge 251C of object structure for the first object 251, and whose boundary surrounds the edge 251C. More particularly, the edge 251C may be an edge of the surface 251A of the object structure for the first object 251, and 2D region 620 may be co-planar with the surface 251A. Further, the edge 251C may be located within the 2D region 620. In some aspects, the control circuit 111 may determine the 2D region 620 as a region having: (i) a defined size and (ii) having a center that is located on the edge 251C. In some instances, the center of the 2D region 620 may be a center of the edge 251C. The 2D region 620, which is co-planar with the edge 251C of object structure for the first object 251 and whose boundary surrounds the edge 251C, is also illustrated in FIG. 6B.

FIG. 7A depicts the target feature as the visual feature 751B, and/or as an outline of the surface 751A of the object structure for the first object 751, as discussed above. In the example of FIG. 7A, the control circuit 111 may determine, as part of step 406, a 2D region 720 (e.g., square region). The 2D region 720 may be co-planar with the visual feature 751B, and with the outline of the surface 751A. Further, the 2D region 720 may have a boundary that surrounds the visual feature 751B, and that also surrounds the outline of the surface 751A.

In an embodiment, the control circuit 111 may be configured to determine the 2D region 520/620/720 based on a defined size stored in, e.g., the non-transitory computer-readable medium. The defined size may be, for instance, a fixed size for the 2D region 520/620/720. For example, when the target feature is a corner (e.g., 251B), the 2D region (e.g., 520) which surrounds and is co-planar with the corner may be a square region having a fixed size of, e.g., 2 cm×2 cm or 5 cm×5 cm. In an embodiment, the control circuit 111 may be configured to determine the size of the 2D region (e.g., 620/720) based on a size of the target feature. For example, the control circuit 111 may be configured to determine a length of the 2D region 620 as a ratio multiplied by a length of the edge 250C of FIG. 6A. In another example, the control circuit 111 may be configured to determine a length of the 2D region 720 as the ratio multiplied by a length of a first edge (e.g., 750C) forming the outline of the surface 751A of the first object 751, and may be configured to determine a width of the 2D region 720 as the ratio multiplied by a length of a second edge (e.g., 751E) forming the outline, wherein the second edge may be perpendicular to the first edge. The 2D 720 region may have a length and width that have different values, or that have the same value. In some cases, the ratio may be a defined value stored in the non-transitory computer-readable medium 115 or elsewhere. In some cases, the ratio may be dynamically defined or otherwise determined by the control circuit 111.

In an embodiment, the control circuit 111 may be configured to determine a size of the 2D region (e.g., 520/620/720) based on at least one of: an environmental factor or a characteristic of the object structure to which the target feature belongs. In some cases, the environmental factor may include an image noise level, which may indicate, e.g., an amount of lighting in an environment of the camera (e.g., 270/280), or indicate any other condition which may affect an ability of the camera to accurately sense a scene in its field of view (e.g., 272/282). In some cases, the characteristic of the object structure to which the target feature belongs may include, e.g., at least one of a shape of the object structure or a texture of a surface of the object structure. For example, an object structure having a round shape may be more likely to affect operation of a 3D camera and cause a decreased accuracy of 3D information generated by the 3D camera for describing the object structure. In some instances, the texture of the surface may indicate a reflectivity of the surface. For example, a more reflective (e.g., a shinier) surface may be more likely to affect operation of a 2D camera and decrease an accuracy of 2D information generated by the 2D camera for capturing or otherwise representing an appearance of the surface. In an embodiment, determining the size of the 2D region (e.g., 620/720) may involve determining the ratio discussed above that is multiplied by a dimension of the target feature. In such an embodiment, the ratio may be determined based on the environmental factor and/or the characteristic of the object structure. In an embodiment, the control circuit 111 may be configured to determine the size of the 2D region (e.g., 520/620/720) based on a relationship in which the size increases as the image noise level increases. In some instances, increasing the size of the of the 2D region (e.g., 520/620/720) may increase a size of an occluding region, which is discussed below.

Referring back to FIGS. 4A-4B, the method may include a step 408 in which the control circuit 111 determines a 3D region defined by connecting a location of the first camera of step 402 (e.g., first camera 270) and the boundary of the 2D region, where the 3D region is part of the first camera field of view (e.g., 272). In an embodiment, the location of first camera (e.g., 270) that is used to define the 3D region may be a focal point of the first camera, a location on an image sensor of the first camera 270, such as a corner or center of the image sensor, or may be any other location. In some cases, the 3D region may be a portion of the first camera field of view (e.g., 272) used for occlusion analysis, and may be referred to as an analysis field of view.

As an example of step 408, FIG. 5A depicts an example 3D region 530 that is defined by connecting a location of the first camera 270 and the boundary of the 2D region 520. More particularly, the 3D region 530 may be defined by lines 530A-530D, which connect the location of the camera 270 to four respective corners of the boundary of the 2D region 520. In some instances, determining the 3D region may involve determining information which represents the lines 530A-530D.

In another example, FIG. 6A depicts an example 3D region 630 that is defined by connecting a location of first camera 270 and the boundary of the 2D region 620. The 3D region 630 may be also be defined by connecting the location of the camera 270 to the boundary of the 2D region 620, and more specifically defined by lines 630A-630D that extend from the location of the camera 270 to the respective corners of the 2D region 620. FIG. 7A provides an example in which a 3D region 730 is defined by connecting a location of the first camera 270 and the boundary of the 2D region 720. More particularly, the 3D region 720 may be defined by connecting lines 730A-730D from the location of the camera 270 to the four respective corners of the 2D region 720. In an embodiment, the 3D region (e.g., 530/630/730) may form an imaginary pyramid, such as when the corresponding 2D region (e.g., 520/620/720) is a rectangular region (e.g., a square region). In other embodiments, the 3D region may form any other 3D shape, such as an imaginary cone defined by connecting a location of the first camera 270 with a circular 2D region.

Referring back to FIGS. 4A-4B, the method 400 may include a step 412 in which the control circuit 111 determines, based on the camera data and the 3D region, a size (e.g., an area) of an occluding region. In an embodiment, the occluding region may be a region of the stack structure (of step 402) that is located between the target feature and the at least one camera and is within the 3D region (e.g., 530/630/730). More particularly, the occluding region may be a region that is not co-planar with the target feature, and that is further located closer to the first camera (e.g., 270) of the at least one camera than is the target feature, such that the occluding region is located between the target feature and the first camera. For instance, the occluding region may be a region that is higher than the target feature. Because the occluding region is between the first camera and the target feature, and is within the 3D region (e.g., 530/630/730), it represents a portion of the stack structure that may be at a location that is blocking or close to blocking the target feature (e.g., 251B/251C/751B), or a portion of a region surrounding the target feature, from being viewed by the first camera (e.g., 270). Thus, the size of the occluding region may be used in assessing occlusion in the first camera field of view (e.g., 272).

Figure 5D:
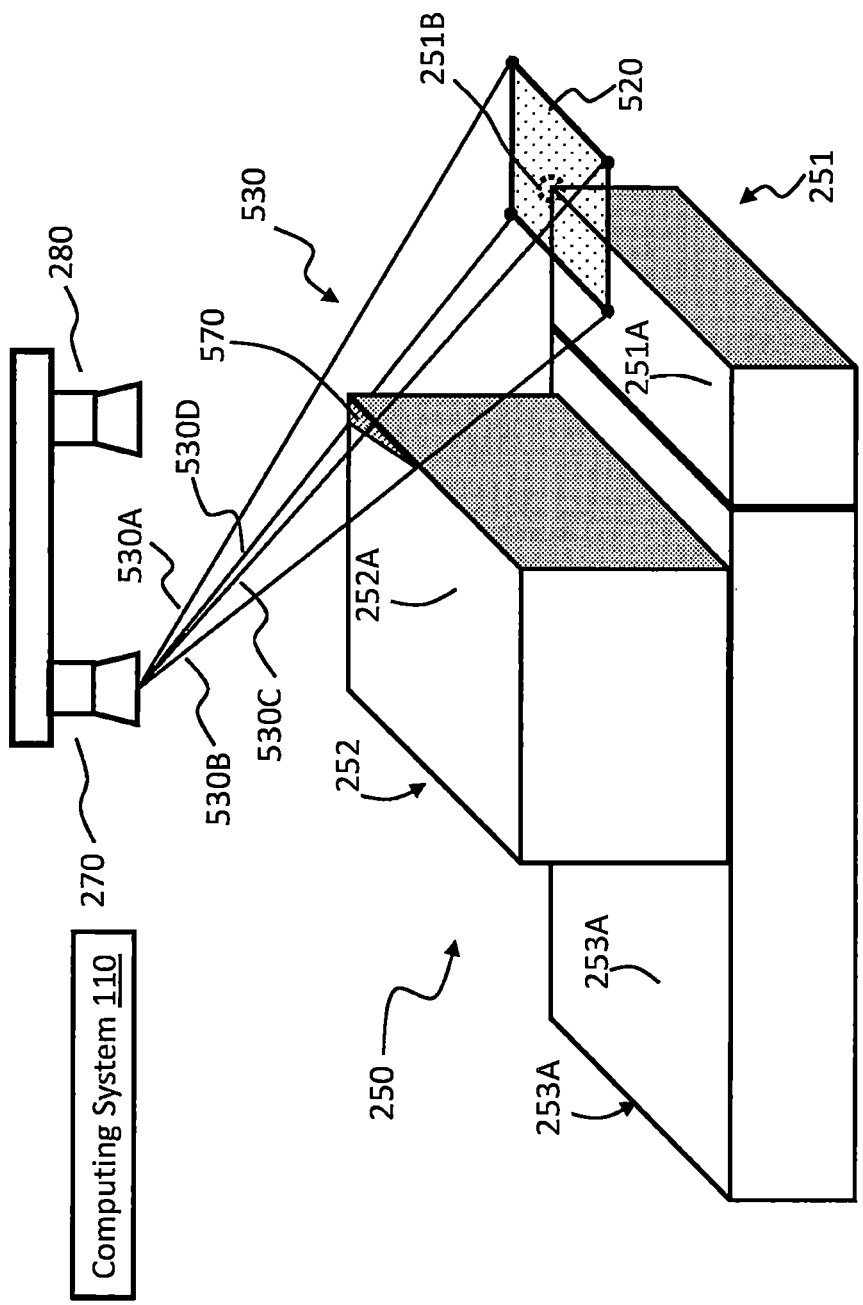

To illustrate an example of step 412, FIG. 5D depicts an occluding region 570. More particularly, the occluding region 570 may be a region of the stack structure for the stack 250, and more specifically a region of the surface 252A (e.g., top surface) of the object structure for the second object 252. Further, the occluding region 570 may be located between the corner 251B (which is the target feature of FIGS. 5A and 5D) and the first camera 270, and may be within the 3D region 530. As discussed above, the 3D region 530 may be an imaginary pyramid located within the first camera field of view 272 (which is illustrated in FIGS. 3A and 3B), and may be defined based on the 2D region 520 whose boundary surrounds the corner 251B. In this example, the 2D region 520 may be a first 2D region, and the occluding region 570 may be a second 2D region that is parallel to the first 2D region and within the imaginary pyramid of the 3D region 530. In some instances, the occluding region 570 may include at least a region that is: (i) parallel with the 2D region 520, and (ii) inside the 3D region 530.

Figure 6D:
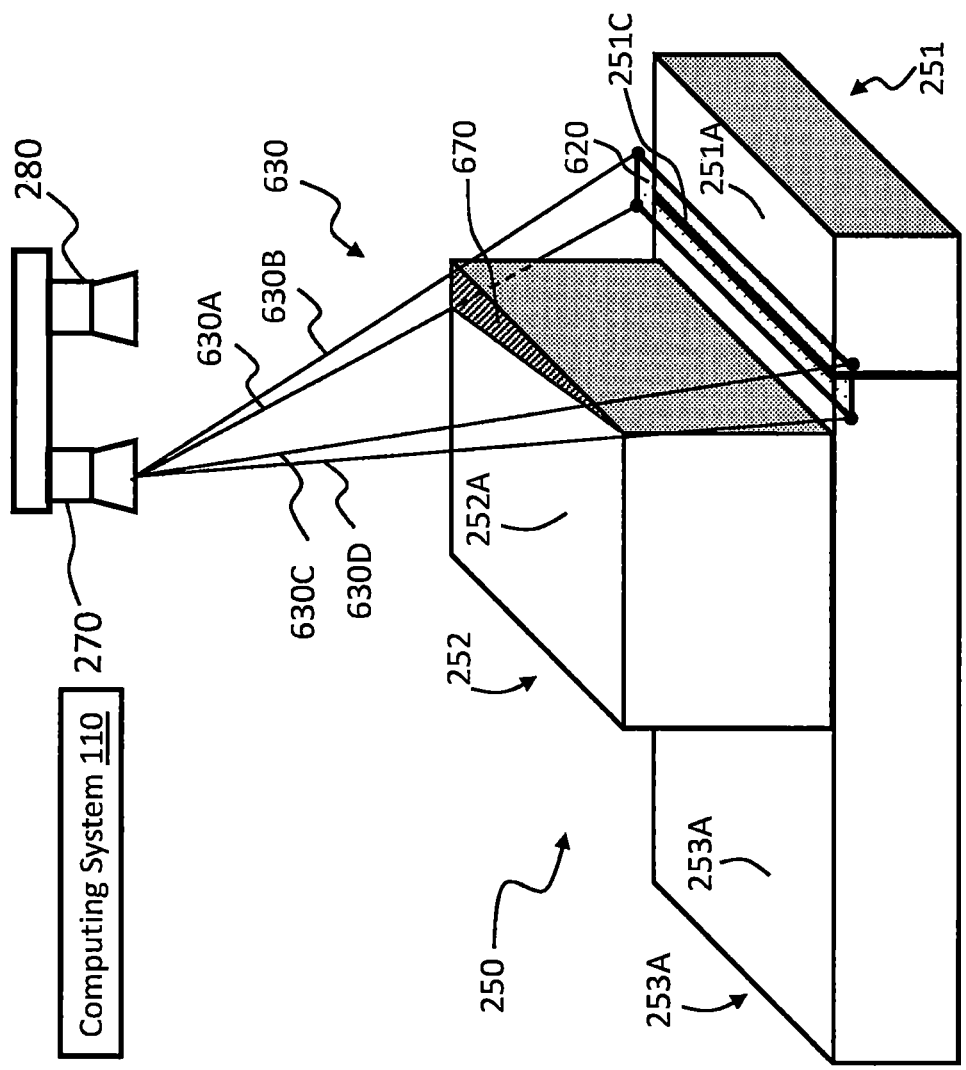
Figure 7C:
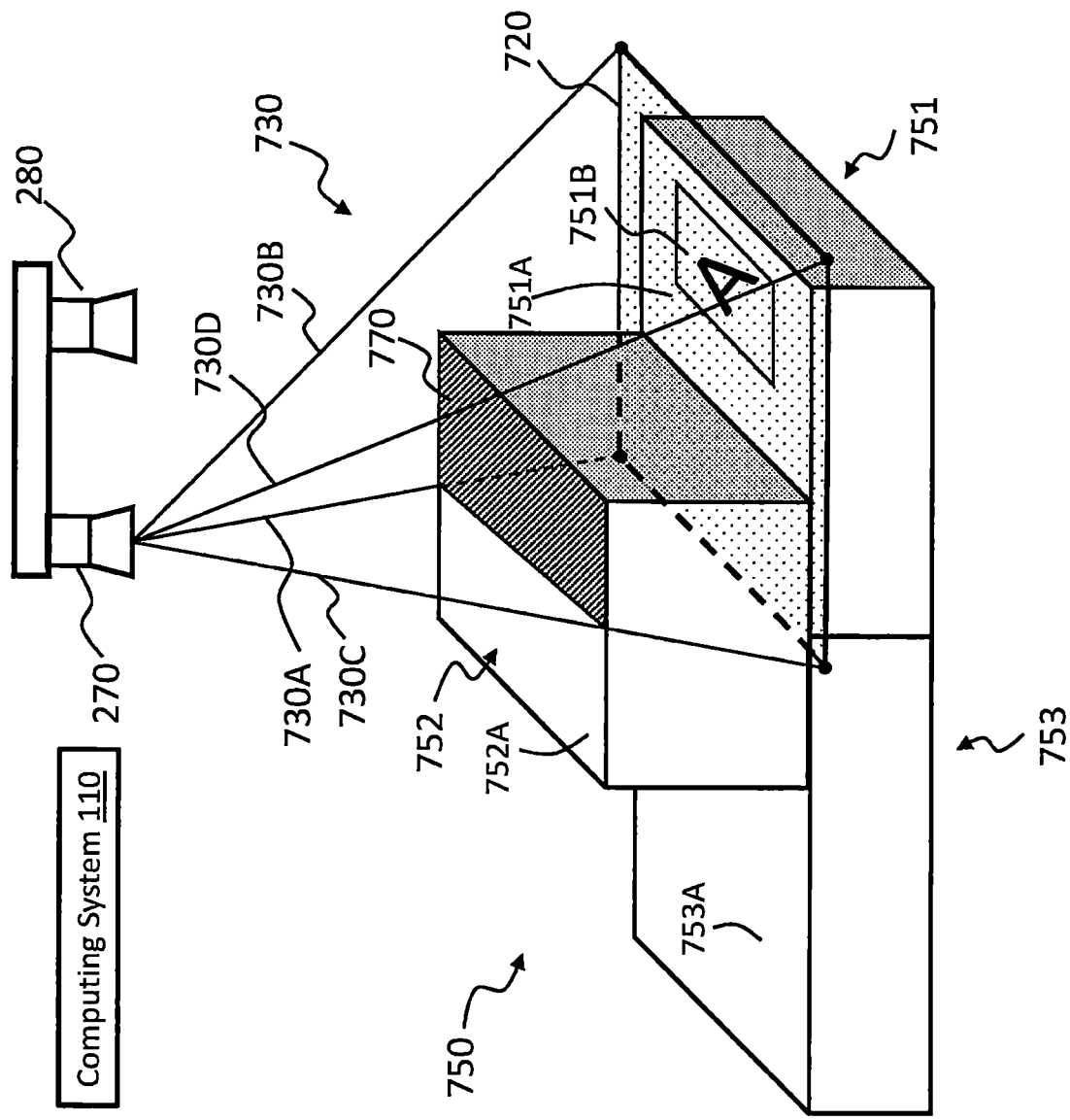

In another example, FIG. 6D illustrates an occluding region 670 that is a region of the stack structure for the stack 250 that is located between the edge 251C (which is the target feature of FIGS. 6A and 6D) and the camera 270, and is within the 3D region 630. More particularly, the occluding region 670 may be a region on the surface 252A of the second object 252, wherein the region is within the imaginary pyramid formed by the 3D region 630, and is located between the first camera 270 and the edge 251C. In the example of FIG. 6D, the occluding region 670 may be parallel with the 2D region 620. FIG. 7C depicts an occluding region 770 that is a region of the stack structure for the stack 750 that is located between the target feature of FIGS. 7A and 7C (e.g., the visual feature 751B or the outline of the surface 751A) and the first camera 270, and is within the 3D region 730. More particularly, the occluding region 770 may be a region on the surface 752A of the second object 752, wherein the region is within the imaginary period formed by the 3D region 730, and is located between the first camera 270 and the target feature. In the example of FIG. 7C, the occluding region 770 may be parallel with the 2D region 720. As stated above, the occluding region 570/670/770 may in an embodiment be a region that is on a surface which is parallel with the 2D region 520/620/720 determined in step 406, such as the surface 252A/752A of the second object 252/752. In some cases, the occluding region 570/670/770 may be limited to being on a surface or surfaces that are parallel with the 2D region 520/620/720. In some cases, the occluding region 570 may extend to another surface or surfaces, such as a surface perpendicular to the surface 252A/752A (but still remaining within the 3D region 530/630/730).

Figure 6E:
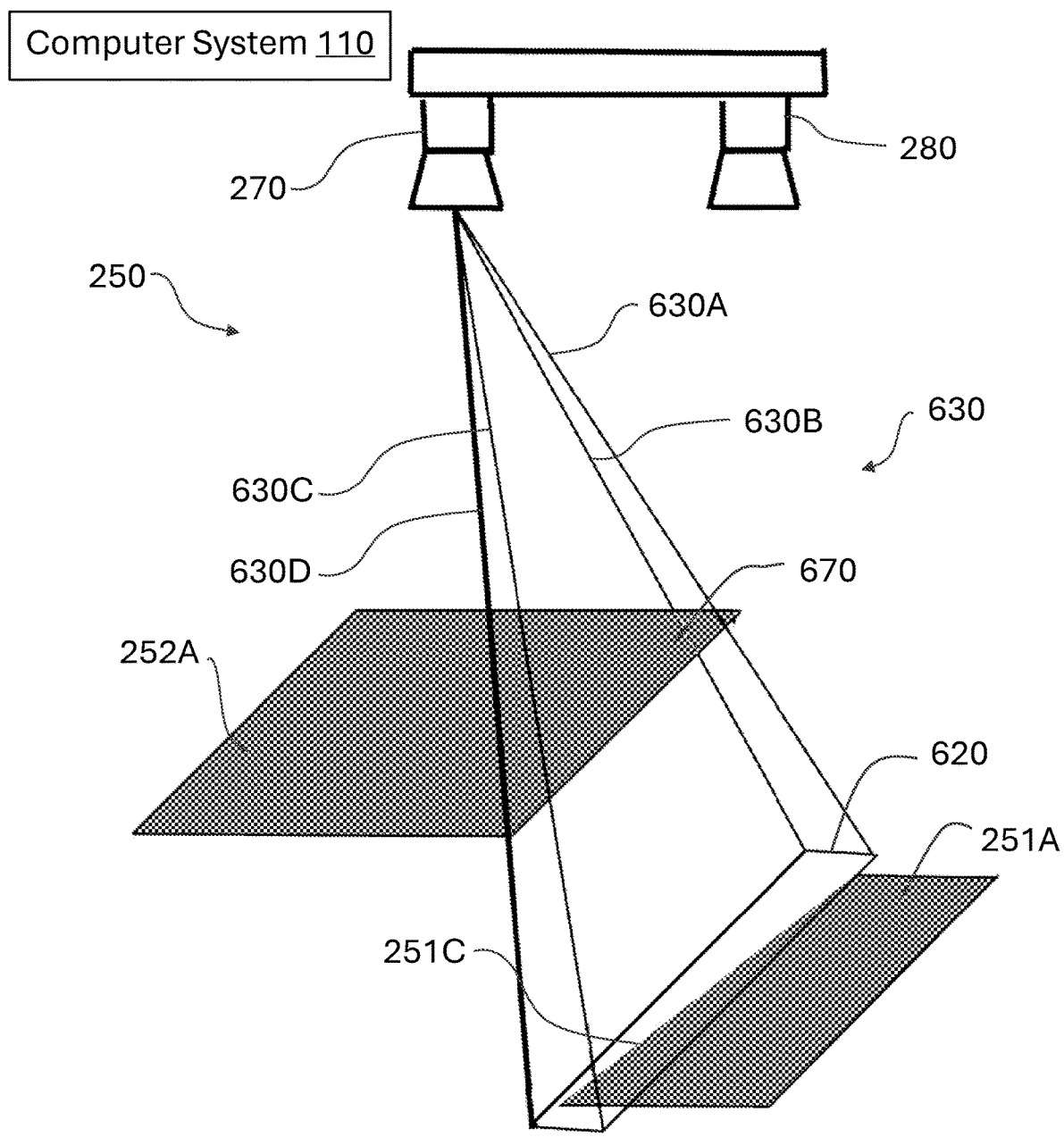

FIG. 6E illustrates the occluding region 670, which is a region on the surface 252A of the second object 252, and within the imaginary pyramid formed by the 3D region 630. The occluding region 670 may be located between the first camera 270 and the edge 251C. FIG. 6E illustrates that all or a portion of the occluding region 670 may be missing from the lower depth data 251A based on the difference in distance from the first camera 270 and/or the second camera 280.

In some aspects, the control circuit 111 may determine the size of the occluding region (e.g., 570/670/770) based on 3D information from the camera data generated by, e.g., the first camera 270. The 3D information may indicate, e.g., depth information which identifies a group of locations on one or more surfaces the stack structure for the stack which are closer to the first camera 270 than is the target feature to the camera 270 (e.g., locations on surface 251A/751A). The control circuit 111 may determine which locations from among the group of locations are within the 3D region (e.g., 530/630/730) determined in step 408, and determine the size of the occluding region based on the group of locations.

For instance, in the example of FIGS. 5D, 6D, and 7C, the control circuit 111 may be configured to determine, from the camera data, a plurality of 3D data points (e.g., 3D coordinates) for representing respective locations on one or more surfaces of a stack structure, such as a surface 251A/751A (e.g., top surface) of a first object 251/751 of the stack 250/750, a surface 252A/752A of a second object 252/752 of the stack 250/750, and a surface 253A/753A of a third object 253/753 of the stack 250/750. The control circuit 111 in this example may further determine, as an expected depth value, a depth value of $Z_2$ associated with the target feature 251B/251C/751B. For example, the expected depth value associated with the target feature 251B/251C/751B may be a Z-component of a 3D coordinate (e.g., $[X\ Y\ Z]^T$) of the target feature 251B/251C/751B, wherein the 3D coordinate may be in a common reference frame, as discussed above. Further, the control circuit 111 may further determine a subset of the plurality of 3D data points for representing respective locations on the one or more surfaces of the stack structure which are closer to the first camera 270 relative to the expected depth value of $Z_2$ and which are within the 3D region 530/630/730. The subset may represent 3D data points associated with locations which are between the target feature 251B/251C/751B and the camera 270, and are located within the 3D region 530/630/730. In this example, the subset may be the 3D data points associated with locations on the surface 252A/752A of an object structure for the second object 252/752 of the stack 250/750.

In some aspects, the control circuit 111 may determine the size of the occluding region (e.g., 570/670/770) by determining an area of the occluding region, a dimension of the occluding region, or any combination thereof. In some instances, the control circuit 111 may be configured to determine the size of the occluding region (e.g., 570/670/770) based on the subset of 3D data points discussed above. For example, the size of the occluding region may be based on a number of 3D data points in the subset of 3D data points, or based on determining a boundary of a region defined by the subset of 3D data points, and integrating that region to determine an area thereof.

In an embodiment, the subset of 3D data points may be determined based on comparing the expected depth value (e.g., $Z_2$) with respective depth values (e.g., $Z_1$ and $Z_2$) associated with the plurality of 3D data points. For instance, the subset may be determined by identifying 3D data points from among the plurality of 3D data points that: i) are associated with respective depth values (e.g., $Z_1$) which are smaller than the expected depth value (e.g., $Z_2$) by at least a defined difference threshold, and ii) are within the 3D region (e.g., 530/630/730). In this example, the defined difference threshold may account for image noise or surface imperfections which can cause slight variation in depth values for locations which are actually on the same surface (e.g., 251A). Thus, to determine whether a location is on a surface closer than a first surface on which the target feature is located, the control circuit 111 may determine whether a depth value of the location is smaller than the expected depth value of the first surface by at least the defined difference threshold.

Figure 7D:
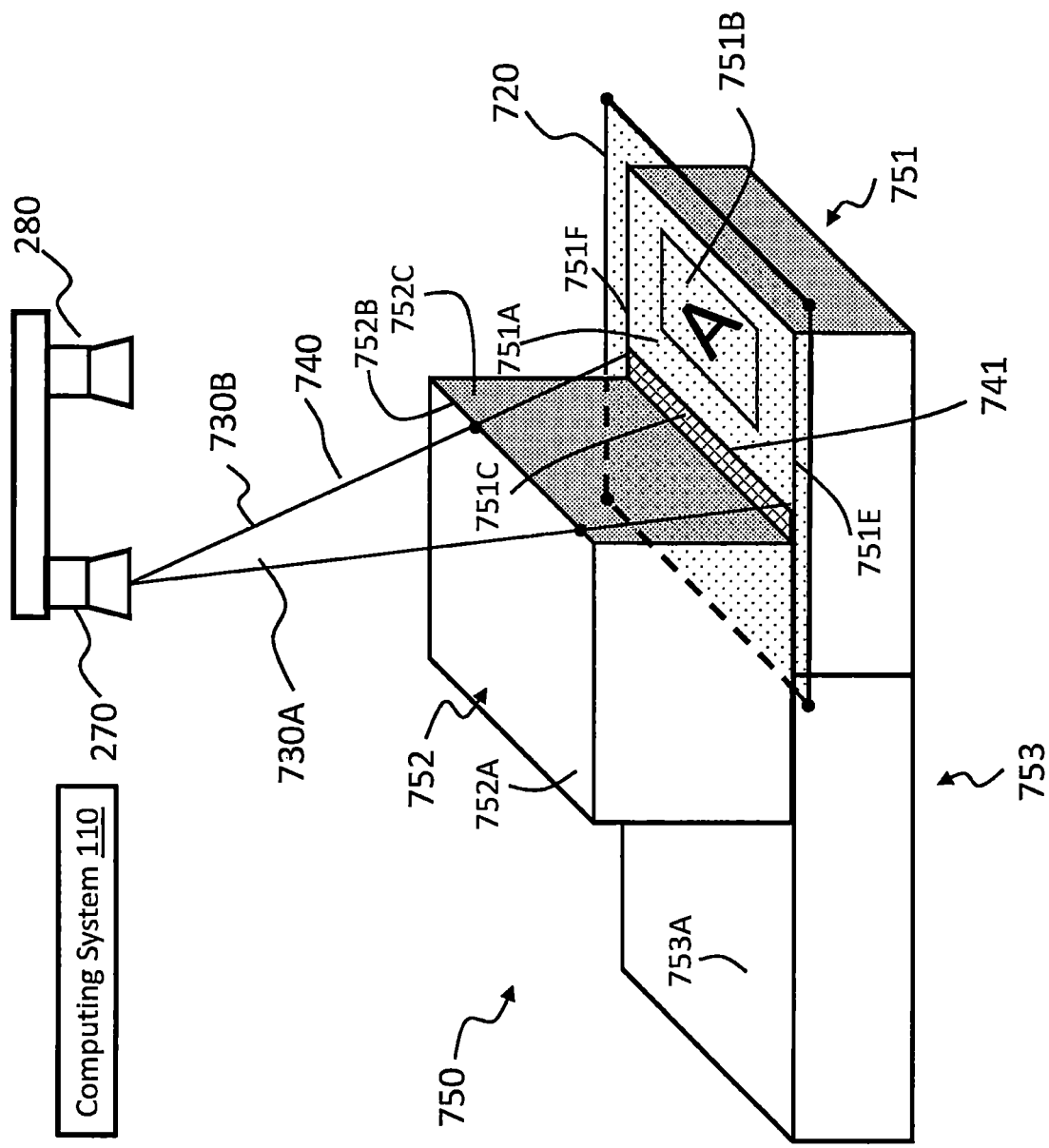

In an embodiment, the control circuit 111 may be configured to determine a size of an occluded region, such as the occluded region 751C of FIG. 7D. The occluded region (e.g., 751C) may be a region that is co-planar with the target feature, such as the target feature 751B, and/or the target features 251B/251C depicted in FIGS. 5A and 6A. For instance, the occluded region 751C may be on a surface 751A on which the target feature 751B is located. In an embodiment, the control circuit 111 may define the occluded region 751C by identifying an edge or corner of the stack structure for the stack 750 which is closer to the first camera 270 than is the target feature 751B (or 251B/251C of FIGS. 5A and 6A) to the first camera 270, by defining a plane (a flat plane or curved plane) which extends from a location of the first camera 270 to the edge or corner of the stack structure, projecting the plane to a surface on which the target feature is located, and determining an intersection between the plane and the surface. In the example of FIG. 7D, the control circuit may 111 identify the edge 752B of the surface 752A as an edge of the stack structure which is closer to the first camera 270 than is the target feature 751B. The control circuit 111 may define a plane 740 that extends from the location of the first camera 270 to the edge 752B, and project the plane 740 to the surface 751A on which the target feature 751B is located. The control circuit 111 may further determine line 741 as an intersection between the plane 740 and the surface 751A. In this example, line 741 may be an edge that forms part of a boundary of the occluded region 751C. In some cases, the boundary of the occluded region 751C may further be formed by one or more edges of the surface 751A on which the target feature 751B is located, such as edges 751E and 751F. In some cases, the boundary may further be formed by one or more surfaces of the stack structure, such as the surface 752C of the second object 752, which intersect the surface 751A on which the target feature 751B is located.

Referring back to FIGS. 4A-4B, the method 400 may further include a step 414, in which the control circuit 111 determines a value of an object recognition confidence parameter based on the size of the occluding region. In some cases, the value of the object recognition confidence parameter may have an inverse relationship with the size of the occluding region. For instance, an increase in the size of the occluding region may cause the value of the object recognition confidence parameter to change in a direction that indicates less confidence in an accuracy of an object recognition operation which has been performed or is being planned. In an embodiment, the control circuit 111 may be configured to determine the value of the object recognition confidence parameter by determining a ratio between the size of the occluding region (e.g., 570/670/770) and a size of the 2D region (e.g., 520/620/720) determined in step 406, or an inverse of the ratio. In an embodiment, the control circuit 111 may alternatively or additionally determine the value of the object recognition confidence parameter based on the size of the occluded region (e.g., 751C of FIG. 7D), such as based on a ratio between the size of the occluded region and the size of the 2D region (e.g., 520/620/720) determined in step 406, or an inverse of the ratio.

In some cases, the value of the object recognition confidence parameter may be based on whether the ratio exceeds a defined occlusion threshold. The defined occlusion threshold may be a value predefined in the non-transitory computer-readable medium 115 of FIG. 2, or may be dynamically defined or otherwise determined by the control circuit 111. In some cases, the control circuit 111 may be configured to dynamically define the occlusion threshold based on, e.g., an amount of lighting in an environment of a camera (e.g., 270), a shape of an object to which the target feature belongs, and/or a texture of a surface of the object. In some cases, the control circuit 111 may adjust a size of the 2D region (e.g., 520/620/720) of step 406 instead of or in addition to the occlusion threshold. For instance, a condition that may reduce accuracy of the object recognition operation (e.g., imaging noise, a round object, and/or an object having a shiny surface) may be expressed by increasing a size of the 2D region, and/or by decreasing the defined occlusion threshold.

In an embodiment, the method 400 further include a step 416, in which the control circuit 111 performs an operation for controlling robot interaction with the stack structure, wherein the operation may be performed based on the value of the object recognition confidence parameter. In some cases, the operation of step 416 may involve outputting a movement command for causing robot motion. The movement command may be determined, e.g., to cause the value of the confidence parameter to change in a manner that indicates less occlusion of the target feature (e.g., in a decreasing direction), and/or indicates more confidence in an object recognition operation. For example, the control circuit 111 may determine a direction of movement for a portion of the stack, such as the first object 251/751 or second object 252/752 of the stack 250/750 of FIGS. 5A and 7A, that may cause the value of the object recognition confidence parameter to change in a direction that indicates less occlusion. In such an example, the control circuit 111 may determine robot motion for causing such a direction of movement for the portion of the stack, and determine a movement command for causing the robot motion. The control circuit 111 may further output the movement command via the communication interface 113. If the movement command is received by, e.g., the robot 150 of FIG. 1C, the robot 150 may move the portion of the stack in the determined direction in response to the movement command.

In an embodiment, the robot interaction with the stack structure for the stack 250/750 may involve performing object recognition to facilitate the robot interaction, wherein the object recognition may be based on the target feature (e.g., 251B/251C/751B) discussed above and based on the camera data from, e.g., the first camera 270. In such an embodiment, the operation for controlling the robot interaction may include re-performing the object recognition, and/or include determining, based on the value of the confidence parameter, whether to re-perform the object recognition. In some cases, the control circuit 111 may further determine robot motion after the object recognition is re-performed. As an example, the control circuit 111 may determine to re-perform the object recognition in response to a determination that the value of the confidence parameter is below a defined confidence threshold. In some instances, the defined confidence threshold may be an inverse of the defined occlusion threshold, and/or inversely related to the defined occlusion threshold. In some instances, the control circuit 111 may determine to re-perform the object recognition if the value of the confidence parameter indicates that the size of the occluding region (e.g., 570/670/770) is too high. For example, the control circuit 111 may determine to re-perform the object recognition if the ratio between the size of the occluding region (e.g., 570/670/770) and the size of the 2D region (e.g., 520/620/720) exceeds the defined occlusion threshold.

Concise Description of Various Embodiments

One aspect of the present disclosure herein relates to Embodiment 1, which includes a computing system having a communication interface and a control circuit. In this embodiment, the communication interface is configured to communicate with at least one camera, which includes a first camera having a first camera field of view. The control circuit in this embodiment is configured, when a stack having a plurality of objects is in the first camera field of view, to receive camera data generated by the at least one camera, wherein the camera data describes a stack structure for the stack, the stack structure being formed from at least an object structure for a first object of the plurality of objects. Further in this embodiment, the control circuit is configured to identify, based on the camera data generated by the at least one camera, a target feature of or disposed on the object structure, the target feature being at least one of: a corner of the object structure, an edge of the object structure, a visual feature disposed on a surface of the object structure, or an outline of the surface of the object structure. The control circuit in this embodiment is also configured to determine a two-dimensional (2D) region that is co-planar with the target feature and whose boundary surrounds the target feature; to determine a three-dimensional (3D) region defined by connecting a location of the first camera and the boundary of the 2D region, wherein the 3D region is part of the first camera field of view; to determine, based on the camera data and the 3D region, a size of an occluding region, the occluding region being a region of the stack structure that is located between the target feature and the at least one camera and is within the 3D region; to determine a value of an object recognition confidence parameter based on the size of the occluding region. The control circuit in this embodiment is further configured to perform an operation for controlling robot interaction with the stack structure, wherein the operation is performed based on the value of the object recognition confidence parameter.

Embodiment 2 includes the computing system of embodiment 1. In embodiment 2, the control circuit is configured to identify the target feature based on information in an object recognition template that describes a size of the object structure or that describes the visual feature appearing on the surface of the object structure.

Embodiment 3 includes the computing system of embodiment 1 or 2. In embodiment 3, the visual feature is an image disposed on the surface of the object structure, and the control circuit is configured to identify the image as the target feature.

Embodiment 4 includes the computing system of any one of embodiments 1-3. In embodiment 4, the control circuit is configured to determine a size of the 2D region based on at least one of an image noise level, a shape of the object structure, or a texture of the surface of the object structure.

Embodiment 5 includes the computing system of any one of embodiments 1-4. In embodiment 5, the target feature is the edge of the object structure, and the control circuit is configured to determine the 2D region as a region having: (i) a defined size and (ii) a center that is located on the edge.

Embodiment 6 includes the computing system of any one of embodiments 1-4. In embodiment 6, the target feature is the corner of the object structure, and the control circuit is configured to determine the 2D region as a region having: (i) a defined size and (ii) a center that is located at the corner.

Embodiment 7 includes the computing system of any one of embodiments 1-6. In embodiment 6, the 3D region is an imaginary pyramid located within the first camera field of view, wherein the 2D region whose boundary surrounds the target feature is a first 2D region, and wherein the occluding region is a second 2D region that is parallel to the first 2D region and within the imaginary pyramid.

Embodiment 8 includes the computing system of any one of embodiments 1-7. In embodiment 8, the control circuit is configured to determine the size of the occluding region by: determining, from the camera data, a plurality of 3D data points for representing respective locations on one or more surfaces of the stack structure; determining, as an expected depth value, a depth value for the target feature relative to the first camera; and determining a subset of the plurality of 3D data points for representing respective locations on the one or more surfaces of the stack structure which are closer to the first camera relative to the expected depth value and which are within the 3D region, wherein the subset is determined based on comparing the expected depth value with respective depth values associated with the plurality of 3D data points.

Embodiment 9 includes the computing system of embodiment 8. In embodiment 9, the subset of 3D data points is determined by identifying, from among the plurality of 3D data points, 3D data points that: i) are associated with respective depth values which are smaller than the expected depth value by at least a defined difference threshold, and ii) are within the 3D region.

Embodiment 10 includes the computing system of any one of embodiments 1-9 In embodiment 10, the first camera with which the communication interface is configured to communicate is a 3D camera configured to generate, as part of the camera data, a plurality of 3D data points that indicate respective depth values for locations on one or more surfaces of the stack structure.

Embodiment 11 includes the computing system of embodiment 10. In embodiment 11, the at least one camera with which the communication interface is configured to communicate further includes a second camera configured to generate, as part of the camera data, a 2D image, and wherein the control circuit is configured to identify the target feature based on the 2D image.

Embodiment 12 includes the computing system of any one of embodiments 1-9. In embodiment 12, the first camera with which the communication interface is configured to communicate is a 2D camera, wherein the at least one camera with which the communication interface is configured to communicate further incudes a second camera configured to generate, as part of the camera data, a plurality of 3D data points for representing respective depth values of locations on one or more surfaces of the stack structure.

Embodiment 13 includes the computing system of any one of embodiments 1-12. In embodiment 13, the control circuit is configured to determine the value of the object recognition confidence parameter by: determining a ratio between the size of the occluding region and a size of the 2D region; and determining the value of the object recognition confidence parameter based on the ratio.

Embodiment 14 includes the computing system of embodiment 13. In embodiment 14, the value of the object recognition confidence parameter is determined based on whether the ratio exceeds a defined occlusion threshold.

Embodiment 15 includes the computing system of any one of embodiments 1-14. In embodiment 15, the location of the first camera is a focal point of the first camera.

Embodiment 16 includes the computing system of any one of embodiments 1-15. In embodiment 16, the operation for controlling the robot interaction includes outputting a movement command for causing robot motion, wherein the movement command is determined to cause the value of the object recognition confidence parameter to change in a manner that indicates less occlusion of the target feature.

Embodiment 17 includes the computing system of any one of embodiments 1-16. In embodiment 17, the control circuit is configured to perform object recognition for the target feature based on the camera data, and wherein the operation for controlling robot interaction includes determining, based on the value of the object recognition confidence parameter, whether to re-perform the object recognition, and includes determining robot motion after the object recognition is re-performed.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A computing system, comprising:
a communication interface configured to communicate with at least a first camera having a first camera field of view; and
at least one processor configured, when a stack having a plurality of objects is in the first camera field of view, to:
receive camera data generated by the first camera, wherein the camera data describes a stack structure for the stack, the stack structure being formed from at least an object structure for a first object of the plurality of objects;
identify, based on the camera data generated by the first camera, at least a portion of an object feature which is a feature of the object structure or is a visual feature disposed on a surface of the object structure;
determine an occlusion check region that includes or borders a region corresponding to the at least portion of the object; and
determine a value of an occlusion parameter based on a size, location, and/or presence of an occlusion region, the occlusion region corresponding to a region of the stack structure that is within the occlusion check region.

2. The computing system of claim 1, wherein:
the at least one processor is further configured to determine an object feature region having a boundary that surrounds the object feature, and
the occlusion check region is a three-dimensional (3D) region that borders or includes the object feature region.

3. The computing system of claim 1, wherein:
the at least one processor is further configured to determine the size of the occlusion region,
the occlusion parameter is a value of an object confidence parameter, and
the at least one processor is further configured to determine the value of the object confidence parameter based on the size of the occlusion region.

4. The computing system of claim 2, wherein:
the occlusion region corresponds to an occluding region, and the occluding region corresponds to a portion of an upper object in the stack structure that is located vertically between the object feature region and the first camera.

5. The computing system of claim 2, wherein:
the occlusion region corresponds to an occluding region, and
the occluding region corresponds to a portion of an upper object in the stack structure that is located directly between the object feature region and the first camera.

6. The computing system of claim 2, wherein:
the occlusion region corresponds to an occluding region, and
the occluding region corresponds to a portion of an upper object in the stack structure that at least partially overlaps the object feature region.

7. The computing system of claim 2, wherein:
the occlusion region corresponds to an occluded region, and
the occluded region corresponds to a portion of the object feature region that is occluded by an upper object in the stack structure located directly between the object feature region and the first camera.

8. The computing system of claim 2, wherein:
the object feature region is two-dimensional (2D), and
the 3D region vertically extends from the object feature region.

9. The computing system of claim 1, wherein:
the object feature region is two 2D, and
the 3D region extends from the object feature region toward the first camera.

10. The computing system of claim 1, wherein the at least one processor is further configured to perform, based on the value of the occlusion parameter, an operation for controlling robot interaction with the stack structure.

11. The computing system of claim 2, wherein:
the at least one processor is further configured to determine a size of the object feature corresponding to the identified at least portion of the object feature, and
a size of the boundary of the object feature region substantially corresponds to the determined size of the object feature.

12. The computing system of claim 2, wherein the object feature region is sized to surround an area corresponding to a size of a surface of the first object.

13. The computing system of claim 2, wherein the at least one processor is further configured to determine the size of the object feature region based on at least one of an image noise level, a shape of the object structure, or a texture of the surface of the object structure.

14. The computing system of claim 2, wherein:
the at least one processor is further configured to identify an edge of the object structure as the object feature, and
the at least one processor is further configured to determine the object feature region as a region having: (i) a defined size and (ii) a center that is located on the edge.

15. The computing system of claim 2, wherein:
the at least one processor is further configured to identify a corner of the object structure as the object feature, and
the at least one processor is further configured to determine the object feature region as a region having: (i) a defined size and (ii) a center that is located at the corner.

16. The computing system of claim 2, wherein:
the at least one processor is further configured to identify a 2D image that is disposed on the surface of the object structure as the object feature, and
the at least one processor is further configured to determine the object feature region as a region that surrounds the 2D image.

17. A non-transitory computer-readable medium having instructions thereon that, when executed by at least one processor of a computing system, configures the at least one processor to:
receive camera data generated by a first camera, wherein the camera data describes a stack structure for a stack having a plurality of objects, the stack structure being formed from at least an object structure for a first object of a plurality of objects,
identify, based on the camera data generated by the first camera, at least a portion of an object feature which is a feature of the object structure or is a visual feature disposed on a surface of the object structure,
determine an occlusion check region that includes or borders a region corresponding to the at least portion of the object, and
determine a value of an occlusion parameter based on a size, location, and/or presence of an occlusion region, the occlusion region corresponding to a region of the stack structure that is within the occlusion check region.

18. The non-transitory computer-readable medium of claim 17, wherein the instructions, when executed by the at least one processor, further configures the at least one processor to perform an operation for controlling robot interaction with the stack structure, wherein the operation is performed based on an object confidence parameter corresponding to the size of the occlusion region.

19. A method performed by at least one processor of a computing system, the method comprising:
receiving camera data generated by a first camera, wherein the camera data describes a stack structure for a stack having a plurality of objects, the stack structure being formed from at least an object structure for a first object of a plurality of objects,
identifying, based on the camera data generated by the first camera, at least a portion of an object feature which is a feature of the object structure or is a visual feature disposed on a surface of the object structure,
determining an occlusion check region that includes or borders a region corresponding to the at least portion of the object, and
determining a value of an occlusion parameter based on a size, location, and/or presence of an occlusion region, the occlusion region corresponding to a region of the stack structure that is within the occlusion check region.

20. The method of claim 19, further comprising performing an operation for controlling robot interaction with the stack structure, wherein the operation is performed based on the value of an object confidence parameter corresponding to the size of the occlusion region.

* * * * *